(12) United States Patent
Murdoch et al.

(10) Patent No.: US 11,176,282 B2
(45) Date of Patent: Nov. 16, 2021

(54) ENCRYPTING DATA ASSOCIATED WITH DECENTRALIZED IDENTIFIER

(71) Applicant: Microsoft Technology Licensing, LLC, Redmond, WA (US)

(72) Inventors: Brandon Murdoch, Reading (GB); Ankur Patel, Sammamish, WA (US); Ronald John Kamiel Eurphrasia Bjones, Dilbeek (BE); Daniel James Buchner, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 16/445,106

(22) Filed: Jun. 18, 2019

(65) Prior Publication Data

US 2020/0401734 A1    Dec. 24, 2020

(51) Int. Cl.
*H04L 29/06* (2006.01)
*G06F 21/78* (2013.01)
*G06F 21/60* (2013.01)
*H04L 9/08* (2006.01)

(52) U.S. Cl.
CPC ............ *G06F 21/78* (2013.01); *G06F 21/604* (2013.01); *H04L 9/0822* (2013.01); *H04L 9/0825* (2013.01); *H04L 9/0866* (2013.01); *H04L 9/0891* (2013.01)

(58) Field of Classification Search
CPC ...... G06F 21/78; G06F 21/604; G06F 21/602; G06F 21/6245; H04L 9/0822; H04L 9/0825; H04L 9/0866; H04L 9/0891; H04L 2209/38

See application file for complete search history.

(56) References Cited

U.S. PATENT DOCUMENTS

| 7,970,143 B2* | 6/2011 | Vennelakanti | G06F 21/602 380/277 |
| 2015/0356311 A1* | 12/2015 | Cousins | H04L 9/0866 713/189 |
| 2019/0305964 A1* | 10/2019 | Hamel | H04L 9/3218 |

OTHER PUBLICATIONS

Goyal et al., "Password-Authenticated Session-Key Generation on the Internet in the Plain Model", In Proceeding of the 30th Annual Conference on Advances in Cryptology, Aug. 2010, pp. 277-294.
Hughes, et al., "A Primer for Decentralized Identifiers", Retrieved From: https://w3c-ccg.github.io/did-primer/#did-documents, Jan. 19, 2019, 7 Pages.

(Continued)

*Primary Examiner* — Yogesh Paliwal
(74) *Attorney, Agent, or Firm* — Workman Nydegger

(57) ABSTRACT

Encrypting and sharing one or more data objects stored or to be stored in a personal storage that is associated with a DID. First an encryption/decryption key is generated using a passphrase and an identifier of the personal storage that stores or is to store a data object in the personal storage. The data object stored or to be stored in the personal storage is then encrypted by the generated encryption/decryption key. The encrypted data object is then stored in the personal storage. The encrypted data object may then be accessed by a DID management module that is configured to manage the DID or be shared to another entity that is not associated with the DID.

20 Claims, 15 Drawing Sheets

(56) References Cited

OTHER PUBLICATIONS

"International Search Report and Written Opinion Issued in PCT Application No. PCT/US2020/034430", dated Jul. 20, 2020, 11 Pages.
Takemiya et al., "Sora Identity: Secure, Digital Identity on the Blockchain", In Proceeding of the IEEE 42nd Annual Computer Software and Applications Conference, vol. 2, Jul. 23, 2018, pp. 582-587.

* cited by examiner

ENCRYPTING DATA ASSOCIATED WITH DECENTRALIZED IDENTIFIER

BACKGROUND OF THE INVENTION

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent of any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of the ledger, which provides a fairly secure platform. In such a decentralized environment, each owner of DID generally has control over his/her own data using his/her DID. The DID owner may access the data stored in the personal storage that is associated with the DID via a DID management module, which may be a mobile app, a personal computer, a browser, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Embodiments disclosed herein are related to encrypting and sharing one or more data objects stored or to be stored in a personal storage that is associated with a DID. An encryption/decryption key is generated using a passphrase and an identifier of the personal storage that stores or is to store a data object. The data object stored or to be stored in the personal storage is then encrypted using the generated encryption/decryption key. The encrypted data object is then stored in the personal storage that is associated with the DID.

In some embodiment, a DID management module that is configured to manage the DID is allowed to access the data object. In this embodiment, a request for accessing the data object from the DID management module may first be received. In response to the request, the encrypted data object is sent to the DID management module. The DID management module is caused to have access to the passphrase and the identifier of the first personal storage, such that the DID management module is capable of regenerating the encryption/decryption key that was used to encrypt the data object.

In some embodiment, another entity that is not associated with the DID may be allowed to access the data object. In this embodiment, a request for accessing the encrypted data object from another entity may first be received. In response to the request, a protection strategy for protecting the encryption/decryption key is negotiated between the computing system that encrypted the data object and the other entity. In some embodiment, the protection strategy may include encrypting the encryption/decryption key using a second encryption/decryption key of the other entity. The encrypted encryption/decryption key may then be sent to the other entity with the encrypted data object. The other entity may decrypt the encrypted encryption/decryption key. Thereafter, the other entity may decrypt the encrypted data using the decrypted encryption/decryption key.

Additional features and advantages will be set forth in the description which follows, and in part will e obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
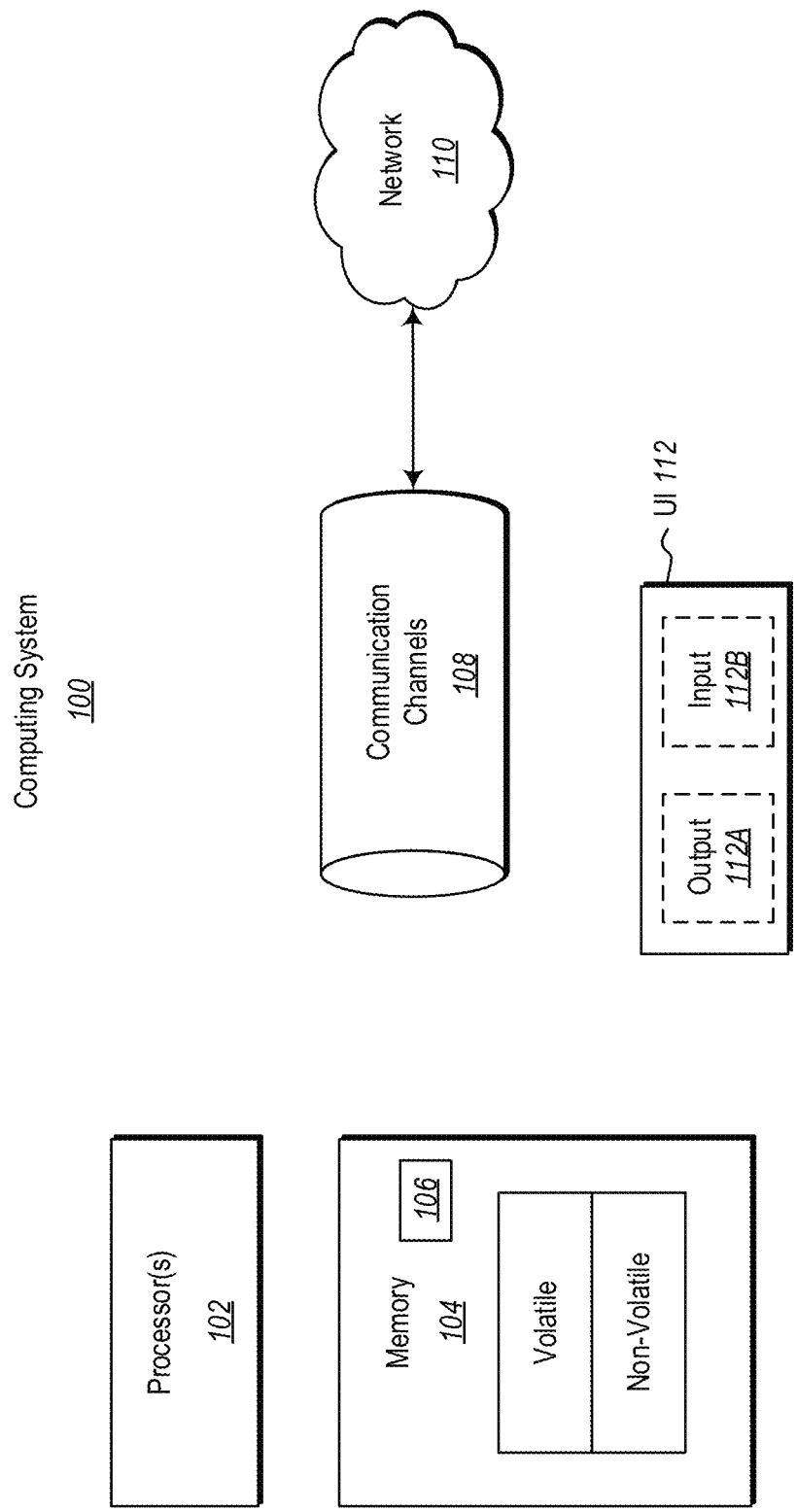
FIG. 1 illustrates an example computing system in which the principles described herein may be employed.

Embodiments disclosed herein are related to encrypting and sharing one or more data objects stored or to be stored in a personal storage that is associated with a DID. An encryption/decryption key is generated using a passphrase and an identifier of the personal storage that stores or is to store a data object. The data object stored or to be stored in the personal storage is then encrypted using the generated encryption/decryption key. The encrypted data object is then stored in the personal storage that is associated with the DID.

In some embodiment, a DID management module that is configured to manage the DID is allowed to access the data object. In this embodiment, a request for accessing the data object from the DID management module may first be received. In response to the request, the encrypted data object is sent to the DID management module. The DID management module is caused to have access to the passphrase and the identifier of the first personal storage, such that the DID management module is capable of regenerating the encryption/decryption key that was used to encrypt the data object.

In some embodiment, another entity that is not associated with the DID may be allowed to access the data object. In this embodiment, a request for accessing the encrypted data object from another entity may first be received. In response to the request, a protection strategy for protecting the encryption/decryption key is negotiated between the computing system that encrypted the data object and the other entity. In some embodiment, the protection strategy may include encrypting the encryption/decryption key using a second encryption/decryption key of the other entity. The encrypted encryption/decryption key may then be sent to the other entity with the encrypted data object. The other entity may decrypt the encrypted encryption/decryption key. Thereafter, the other entity may decrypt the encrypted data using the decrypted encryption/decryption key.

The principles described herein allow a DID owner's personal data be stored as encrypted data and allow the DID owner's management module to securely access the encrypted data. Further, the encrypted data can also be securely shared with another entity that is not associated with the DID owner. Additionally, the other entity's identifier (e.g., DID or another identifier) is not required to be recorded in the metadata of the shared data object or anywhere in the personal storage, such that the service provider of the personal storage cannot correlate the relationships between the DID owner and the other entity. Thus, the privacy of the DID owner and the other entity is further protected.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within an FPGA or an ASIC, the computer-executable instructions may be hard coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
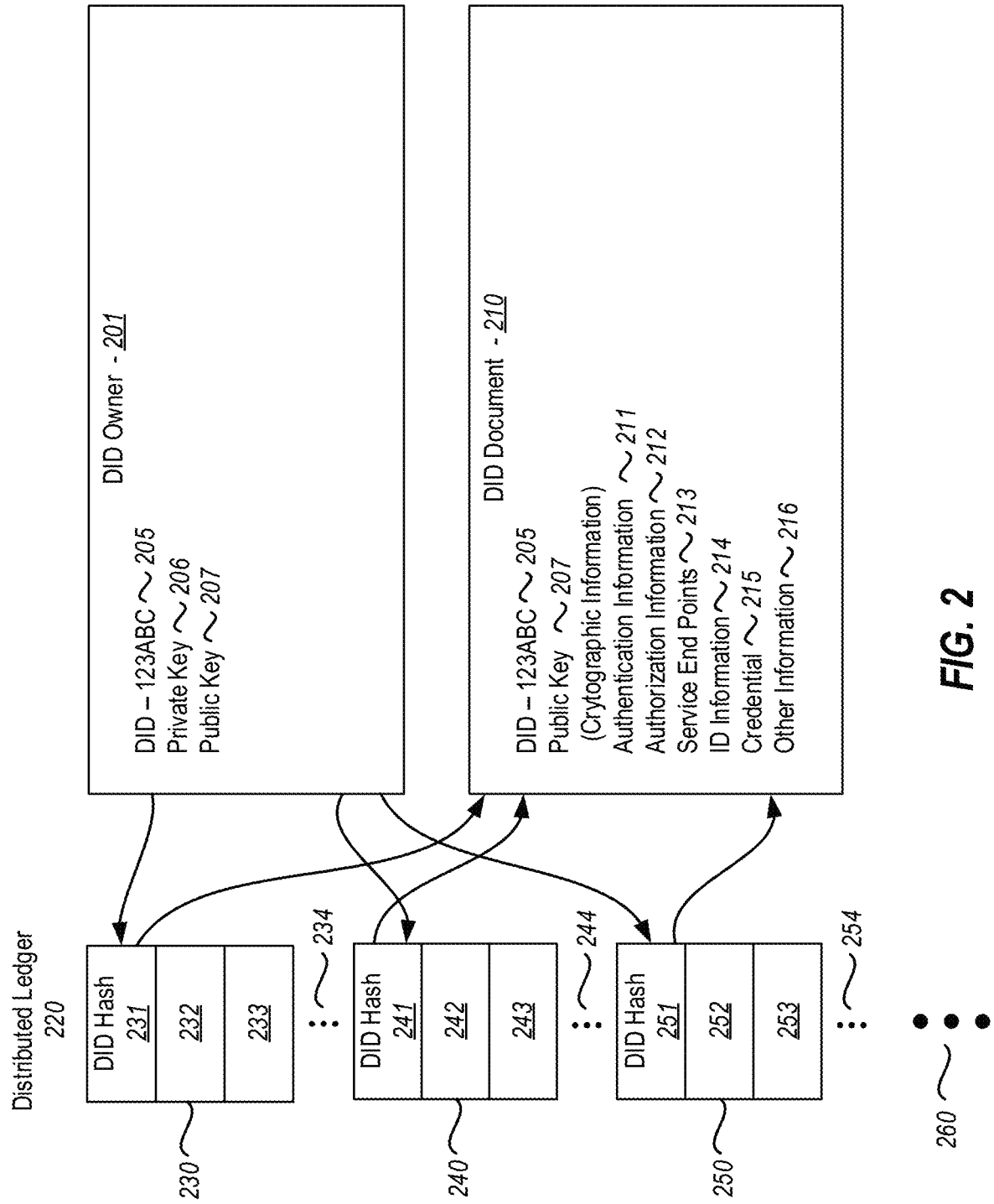
FIG. 2 illustrates an example environment for creating a decentralized identification or identifier (DID)

Some introductory discussion of a decentralized identification (DID) and the environment is which they are created and reside will not be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 may be any identifier that is under the control of the DID owner 201 and independent of any centralized authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 20. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. The private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanism may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are permitted by the DID owner 201 to access information and data owned by the DID owner 201. The public key 207 may also be used by verifying that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third-party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child, and the third party is a parent or guardian of the child. The authorization information 212 may allow the parent or guardian to limit the use of the DID 201 until such time as the child is no longer a minor.

The authorization information 212 may also specify one or more mechanisms that the third party will need to follow to prove they are authorized to modify the DID document 210. In some embodiments, this mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third-party entities to access the services that operate on behalf of the DID owner 201. Specific examples of service endpoints 213 will be explained in more detail to follow.

The ID document 210 may further include identification information 214. The identification information 214 may include personally identifiable information such as the name, address, occupation, family members, age, hobbies, interests, or the like of DID owner 201. Accordingly, the identification information 214 listed in the DID document 210 may represent a different persona of the DID owner 201 for different purposes. For instance, a persona may be pseudo-anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID has 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID has 231, DID has 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID has 241, and DID has 251 may include, in addition to the pointer to the DID document 210, a record or time stamp that specifies when the DID 205 was created. At a later date when modifications are made to the DID document 210, this may also be recorded in DID has 231, DID has 241, and DID has 251. The DID has 231, DID has 241, and DID hash 251 may further include a copy of the public key 207 so that the DID 205 is cryptographically bound to the DID document 210.

Figure 3:
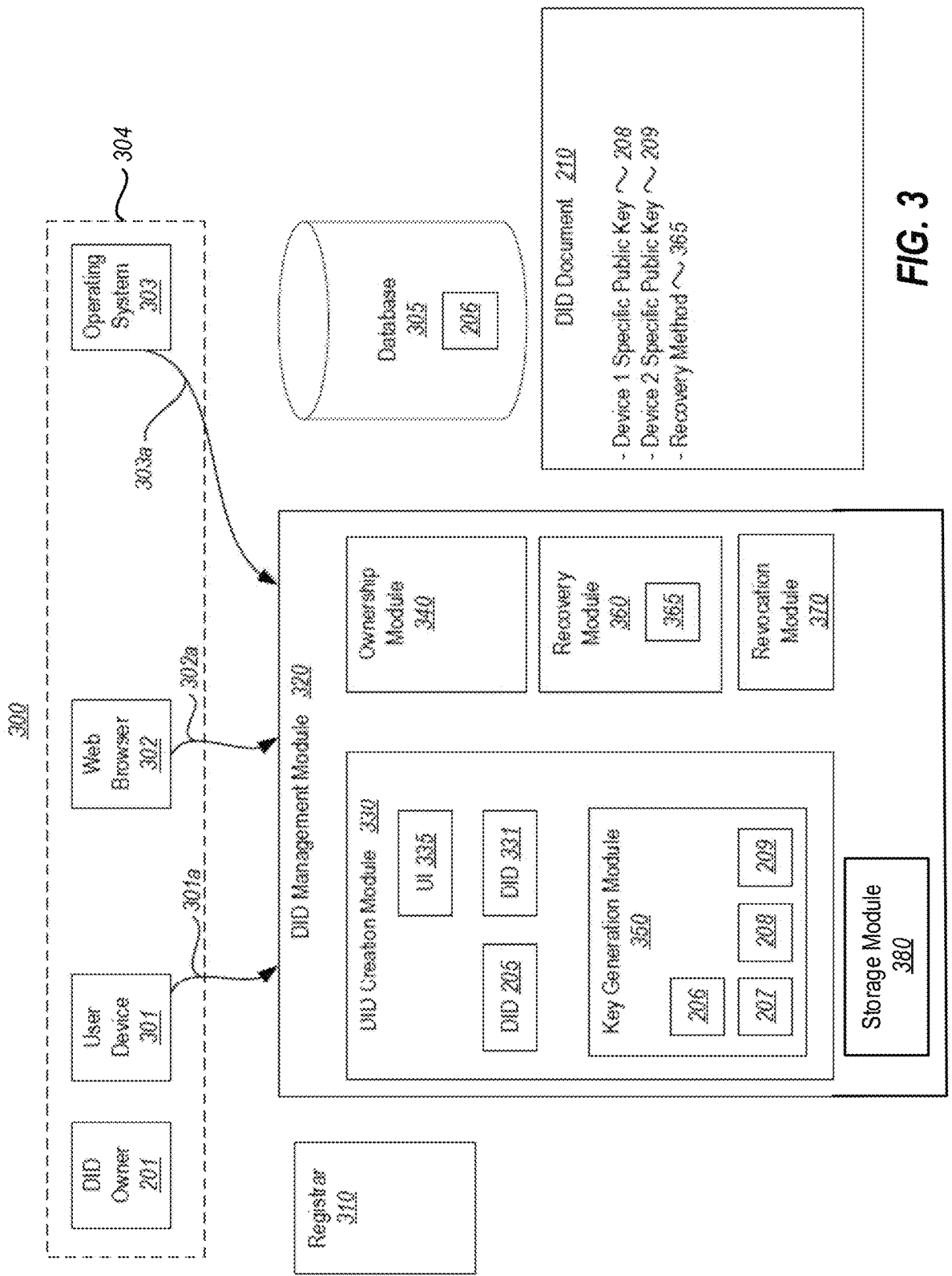
FIG. 3 illustrates an example environment for various DID management operations and services.

Having described DIDs and how they generally operate with reference to FIG. 2, specific embodiments of DIDs will now be explained. Turning to FIG. 3, an environment 300 that may be used to perform various DID lifecycle management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 21. These may include a user device 301. The user device 301 may be, but is not limited to, a mobile device such as a smartphone, a computing device such as a laptop computer, or any device such as a car or an appliance that includes computing abilities. The device 301 may include a web browser 302 operating on the device and an operating system 303 operating the device. More broadly speaking, the dashed line 304 represents that all of these devices may be owned or otherwise under the control of the DID owner 201.

The environment 300 also includes a DID lifestyle management module 320. It will be noted that in operation, the DID lifecycle management module 320 may reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human recognizable name for a display name be advantageous. The DID creation module 330 may then generate the DID 205. In the embodiments having the UI 335, the DID 205 may be shown in a listing of identities and may be associated with the human recognizable name.

The DID creation module may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process may use the public key 207 in the has generation.

In some embodiments, the DID lifecycle management module 320 may include an ownership module 340. The ownership module 340 may provide mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205 and this would be reflected in an updated transaction on the distributed ledger 220 as previously described.

In some embodiments, however, it may be advantageous to have a public key per device 301 owned by the DID owner 201 as this may allow the DID owner 201 to sign with the specific device public key without having to access a general public key. In other words, since the DID owner 201 will use different devices at different times (for example using a mobile phone in one instance and then using a laptop computer in another instance) it is advantageous to have a key associated with each device to provide efficiencies in signing using the keys. Accordingly, in such embodiments the key generation module may generate additional public keys 208 and 209 when the additional devices execute the DID creation module 330. These additional public keys may be associated with private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID documents 210 may include the information previously described in relation to FIG. 2 in addition to the information shown in FIG. 3. If the DID document 210 existed prior to the device specific public keys being generated, then the DID document 210 would be updated by the creation module 330 via the registrar 310 and this would be reflected in an updated transaction on the distributed ledger 220.

In some embodiments, the DID owner 201 may desire to keep the association of a device with a public key or even with the DID 205 a secret. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The creation module would then generate private and public key pairs and DID documents for each of the devices and have them recorded on the distributed ledger 220 in the manner previously described. Such embodiments may be advantageous for devices that may change ownership as it may be possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party may gain control of the private key 206, especially the provider of the DID lifecycle management module 320. However, there is a chance that the device storing the private key 206 may be lost by the DID owner 201, which may cause the DID owner 201 to lose access to the DID 205. Accordingly, in some embodiments the UI 335 may include the option to allow the DID owner 201 to export the private key 206 to an off device secured database 305 that is under the control of the DID owner 201. In some embodiments, the private key 206 may be stored as a QR code that may scanned by the DID owner 201.

In other embodiments, the DID lifecycle management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide required information that will be needed by the one or more recovery mechanisms 365 when the recovery mechanisms are implemented. The recovery module may then be run on any device associated with the DID 205.

The DID lifecycle management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module may access the DID document 210 and may cause that all references to the device be removed from the DID document. Alternatively, the public key for the device may be removed. This change in the DID document 210 may then be reflected as an updated transaction on the distributed ledger 220 as previously described.

Figure 4:
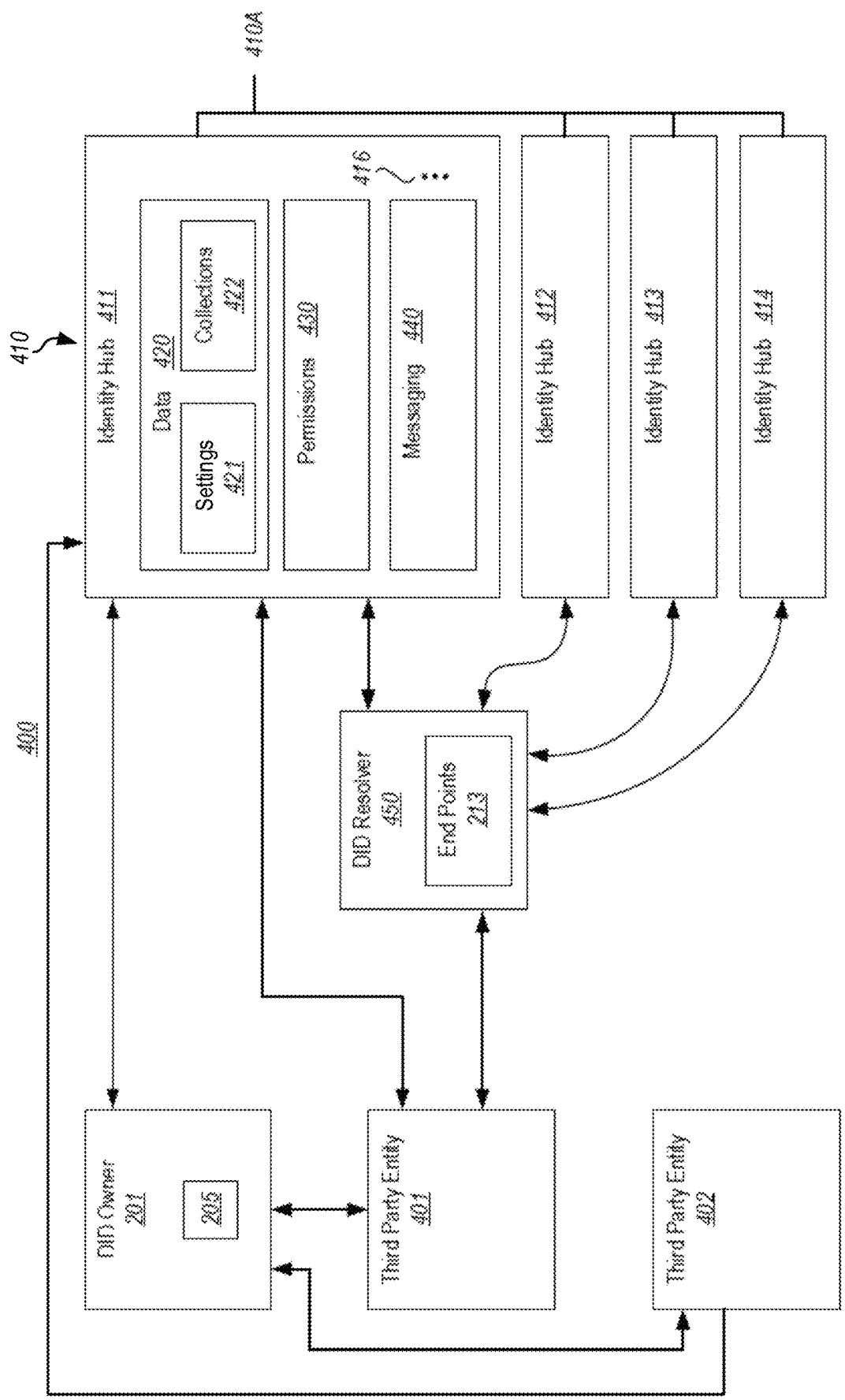
FIG. 4 illustrates an example decentralized personal storage or identity hub.

FIG. 4 illustrates an embodiment of an environment 400 in which a DID such as DID 205 may be utilized. Specifically, the environment 400 will be used to describe the use of the DID 205 in relation to one or more decentralized personal storages or identity hubs. It will be noted that FIG. 4 may include references to elements first discussed in relation to FIG. 2 or 3 and thus use the same reference numeral for ease of explanation.

In one embodiment, the identity hubs 410 may be multiple instances of the same identity hub. This is represented by the line 410A. Thus, the various identity hubs 410 may include at least some of the same data and services. Accordingly, if any change is made to one of the identity hubs 410, the change may be reflected in the remaining identity hubs. For example, the first identity hub 411 and second identity hub 412 are implemented in cloud storage and thus may be able to hold a large amount of data. Accordingly, a full set of the data may be stored in these identity hubs. However, the identity hubs 412 and 413 may have less memory space. Accordingly, in these identity hubs a descriptor of the data stored in the first and second identity hubs may be included. Alternatively, a record of changes made to the data in other identity hubs may be included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will provided as this description may also apply to the identity hubs 412-415. As illustrated, identity hub 411 may include data storage 420. The data storage 420 may be used to store any type of data that is associated with the DID owner 201. In one embodiment the data may be a collection 422 of a specific type of data corresponding to a specific protocol. For example, the collection 422 may be medical records data that corresponds to a specific protocol for medical data. The collection 422 may be any other type of data.

In one embodiment, the stored data may have different authentication and privacy settings 421 associated with the stored data. For example, a first subset of the data may have a setting 421 that allows the data to be publically exposed, but that does not include any authentication to the DID owner 201. This type of data may be for relatively unimportant data such as color schemes and the like. A second subset of the data may have a setting 421 that that allows the data to be publically exposed and that includes authentication to the DID owner 201. A third subset of the data may have a setting 421 that encrypts the subset of data with the private key 206 and public key 207 pair (or some other key pair) associated with the DID owner 201. This type of data will require a party to have access to the public key 207 or to some other associated public key in order to decrypt the data. This process may also include authentication to the DID owner 201. A fourth subset of the data may have a setting 421 that restricts this data to a subset of third parties. This may require that public keys associated with the subset of third parties be used to decrypt the data. For example, the DID owner 201 may cause the setting 421 to specify that only public keys associated with friends of the DID owner 201 may decrypt this data.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may permission to any number of third parties to access a subset of the data 420. This will be explained in more detail to follow.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201.

However, the identity hub 411 may not initially recognize the new device as being owned by the DID owner 201. Accordingly, the identity hub 411 may use the messaging module 440 to contact the DID resolver 450. The message sent to the DID resolver 450 may include the DID 205.

The DID resolver 450 may be a service, application, or module that is configured in operation to search the distributed ledger 220 for DID documents associated with DIDs. Accordingly, in the embodiment the DID resolver 450 may search the distributed ledger 220 using the DID 205, which may result in the DID resolver 450 finding the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge may be successfully answered. The identity hub 411 may then record in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third party entity 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to access the DID document 210. As previously discussed, the DID document 210 may include an end point 213 that is an address or pointer to the identity hub 411. The third party 401 may then use the address or pointer to access the identity hub 411.

The third party 401 may send a message to the messaging module 440 asking for permission to access the research data. The messaging module 440 may then send a message to the DID owner 201 asking if the third party 401 should be given access to the research data. Because the DID owner desires to provide access to this data, the DID owner 201 may allow permission to the third party 401 and this permission may be recorded in the permissions 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may a device of the third party 401 that does the communication.

Advantageously, the above described process allows the identity hub 411 and the third party 401 to communicate and to share the data without the need for the third party to access the identity hub 411 in the conventional manner. Rather, the communication is provisioned in the decentralized manner using the DID 205 and the DID document 210. This advantageously allows the DID owner to be in full control of the process.

As briefly discussed above, the identity hub 411 may be hosted in a cloud service. The service provider may have access to the data stored in each user's identity hub 411. Furthermore, the service provider may also have access to certain activities of the DID owner. For example, the entities with whom the DID owner has shared his/her data may be stored in the identity hub 411. As another example, a user may have multiple DIDs and have shared data amongst the multiple DIDs, alternatively, the user may have used different DID management modules to access the same data. Based on the data sharing activities, the service provider of the identity hub 411 may correlate the relationships of different DIDs and find out that two DIDs may be related or owned by the same owner. Thus, the user's privacy may be compromised.

The principles described herein will solve these potential privacy concerns of DID owners by encrypting the personal data stored in the identity hub 411. The encryption/decryption keys are not stored or accessible by the identity hub 411, so that the DID owners not only have great control to their data from other DID owners or users, but also have their privacy protected from the service providers.

There may be many different objects stored in the identity hub 411. A data object may be a file, a folder, or any portion of data stored in the identity hub 411. The whole identity hub 411 may be encrypted with one encryption/decryption key as one object. Alternatively, different portion of the data stored in the identity hub 411 may be encrypted with different encryption/decryption keys. In particular, the principles described herein allow encrypting different data objects separately, so that an encrypted individual data object can be shared easily.

As described above, decentralized systems provide a fairly secure data storage for the users (e.g., DID owners). Generally, without the private key of DID, it almost impossible for other parties to access the DID owner's data, unless the DID owner grants a permission to the other party to access the DID owner's data. However, when a DID owner grants a permission to another party, the other party's identifier (e.g., DIDs) is often required to be recorded in the permission rules or in the metadata of the identity hub 411, thus, the service provider of the identity hub 411 may be able to correlate the relationships among the DID associated with the data and the other parties that are granted permission to access the data. For example, a user may have multiple DIDs, each of which is dedicated for a persona or a specific purpose. The user may grant permission to each of the same user's DIDs for access the user's personal data stored in different identity hubs. Based on the personal data shared amongst the same user's different DIDs, the service provider of the identity hubs may be able to determine that these different DIDs are likely to belong to a same user.

The principles described herein provide users a greater privacy over their personal data by encrypting the personal data and storing the encrypted personal data in the identity hub 411, while still allowing the encrypted personal data to be accessed via a DID owner's management module, and/or to be shared with other entities. Further details of the embodiments of encrypting and sharing data objects stored in a personal storage that is associated with a DID are described with respect to FIGS. 5 through 15.

Figure 5:
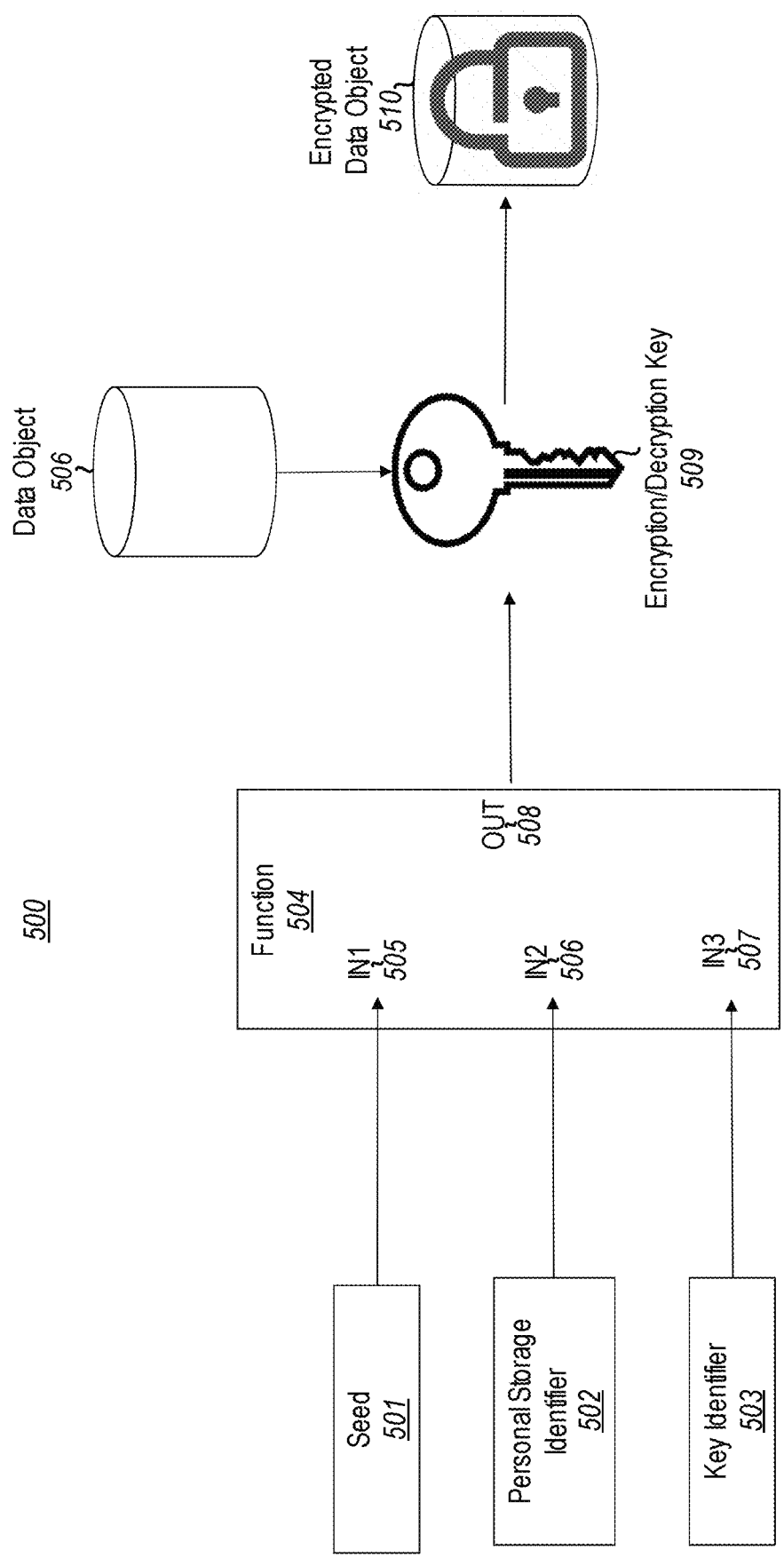
FIG. 5 illustrates an example embodiment for generating an encryption/decryption key.

FIG. 5 illustrates an example embodiment 500 for generating encryption keys. As illustrated in FIG. 5, a seed 501, a personal storage identifier 502, and a key identifier 503 are used as three inputs 505, 506, and 507 into a function 504 to generate an output 508. The output 508 is then used as an encryption/decryption key 509 for encrypting a data object 506. The data object 506 is a data object that is stored or is to be stored in a personal storage (e.g., identity hub 411) that is associated with a DID. After the data object 506 is encrypted, the data object 506 is converted to the encrypted data object 510. The encrypted data object 510 is often called ciphertext, which can only be viewed in its original form if it is decrypted with the correct decryption key 509.

The function 504 may be any deterministic function that can generate a different result when different inputs are received, or only in very rare cases, different inputs may result in a same result. When the possibility of generating the same result from different inputs is very small, such possibility may be ignored, because it is almost impossible for someone to regenerate the encryption/decryption key 509 without the correct three inputs 505, 506 and 507. Also, it is desirable that the function 504 is a one-way function, such that the it is computationally difficult for one to reverse the three inputs using the result. For example, the function 504 may be a hash function that is configured to generate a fixed size code.

The personal storage identifier 502 may be any constant value that is associated with the personal storage (e.g., the ID hub 411, 412, 413 or 414). The constant value may be a combination of more than one constant values. For example, the identity hub 411 may have a storage identifier assigned by its service provider, when the DID owner first started using the service. Alternatively, or in addition, the personal storage identifier 502 may be a combination of an identifier of the service provider (e.g., the service provider's name, a numerical identifier, etc.) and an identifier of the identity hub 411. As another example, the personal storage identifier 502 may be a combination of an identifier of the identity hub and the associated DID.

The key identifier 503 may be an identifier generated by the system or entered by the DID owner for the particular data object, such that a different key may be generated for encrypting/decrypting a different data object stored in the same identity hub 411. Accordingly, many different encryption/decryption keys may be generated, and each encryption/decryption key is used to encrypt and decrypt a particular data object. Each time, a new encryption/decryption key is to be generated, a different key identifier 503 may be generated or entered by the DID owner. The system can merely use a natural number as the key identifier 503, and each time a new key is to be generated, the key identifier increases by one. Alternatively, a random number can be generated as a new key identifier, which is indexed or stored in a storage, that is accessible by the DID owner or the DID owner's management module. Alternatively, certain information related to the data object (e.g., metadata of the data object) that is to be encrypted may be used as the key identifier, such that each time a different object is to be encrypted, a different key identifier will be generated based on the particular information related to the corresponding data object.

The seed 501 may be an input by a user or DID owner, like a passphrase. Alternatively, the seed 501 may be a code generated based on the passphrase that is entered by the user or the DID owner. Further details of an example embodiment for generating the seed 501 will be described below with respect to FIG. 6.

Figure 6:
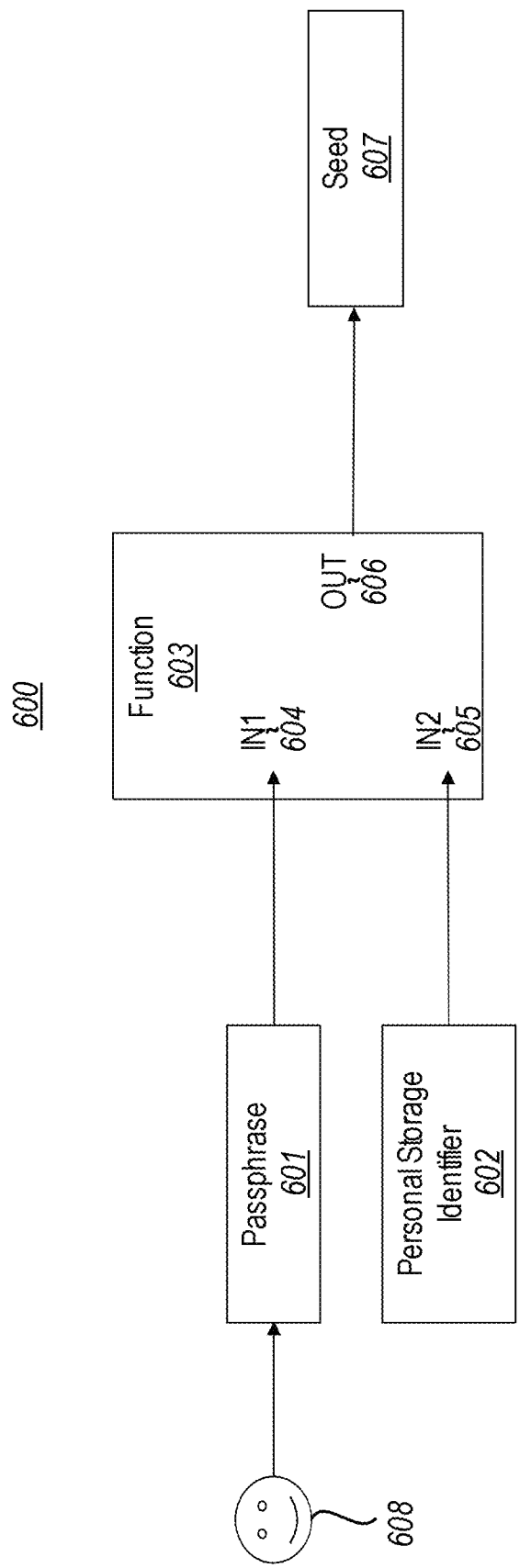
FIG. 6 illustrates an example embodiment for generating a seed that is used to generate the encryption/decryption key of FIG. 5.

FIG. 6 illustrates an example embodiment 600 for generating a seed 607, which may correspond to the seed 501 in FIG. 5. Referring to FIG. 6, a passphrase 601 and a personal storage identifier 602 are used as two inputs of the function 603 to generate an output 606. The output 606 is then used as the seed 607. The passphrase 501 may be an input from the user (e.g., the DID owner) 608. In some embodiment, the personal storage identifier 602 here may be the same personal storage identifier 502. Alternatively, the personal storage identifiers 502 and 602 may be generated using different regime or a different constant value related to the same personal storage; thus, they may not necessarily be the same value.

The function 603 may be any deterministic function that can generate a different result when different inputs 604 and 605 are received. Alternatively, it may be that only in very rare cases different inputs 604 and 605 may result in a same result. As long as the chance of generating the same results using different inputs is very rare, such potential risk may be ignored. Also, it is desirable that the function 504 is a one-way function, such that it is computationally difficult for one to reverse the two inputs 601 and 602 using the output 606. For example, the function 603 may be a hash function that is configured to generate a fixed size code. The generated fixed size code may then be used as the seed 607.

The seed 607 is then used as one of the inputs in function 504 of FIG. 5 to generate the encryption/decryption key 509. Accordingly, even though the encryption/decryption key may be long and complex (e.g., 4096 bits), a user or a DID owner does not have to remember it. Instead, the user or the DID owner only needs to remember the passphrase that he/she originally entered. Each time, when the passphrase is received, the system will be able to regenerate the seed 607, 501. At the same time, the system (e.g., the identity hub 411 and/or a DID management module 320 that is configured to manage the DID) can retrieve the personal storage identifier 502 and the key identifier 503 based on the predetermined key generation regime. Based on the regenerated seed 607, 501, the retrieved personal storage identifier 502 and the key identifier 503, the system can regenerate the encryption/decryption key 509 at any time.

Different types of cryptographic methods may be implemented to encrypt the data object 506. Based on the type of cryptographic method that is implemented, a particular type of encryption/decryption key 509 may be generated. For example, the cryptographic method implemented may be a symmetric encryption key algorithm or an asymmetric key encryption algorithm.

A symmetric key encryption algorithm uses a single symmetric key for both encryption and decryption. Symmetric algorithms generally have the advantage of being much faster than asymmetric key.

An asymmetric key encryption algorithm uses a key pair that includes two different but related keys for encryption and decryption. For example, if the data is encrypted by one of the keys, the encrypted data can be decrypted by the other key; vice versa. Thus, either key can be used to encrypt data. The benefit of the asymmetric key is that one of the keys can be shared with other entities and the other key can be kept secret. Thus, the other entities can use the public key to encrypt data before sending the data to the key owner. The encrypted data can only be decrypted by the private key. As such, the data is protected during communication because only the key owner can decrypt and review the decrypted data, since only the key owner has access to the private key.

Figure 7:
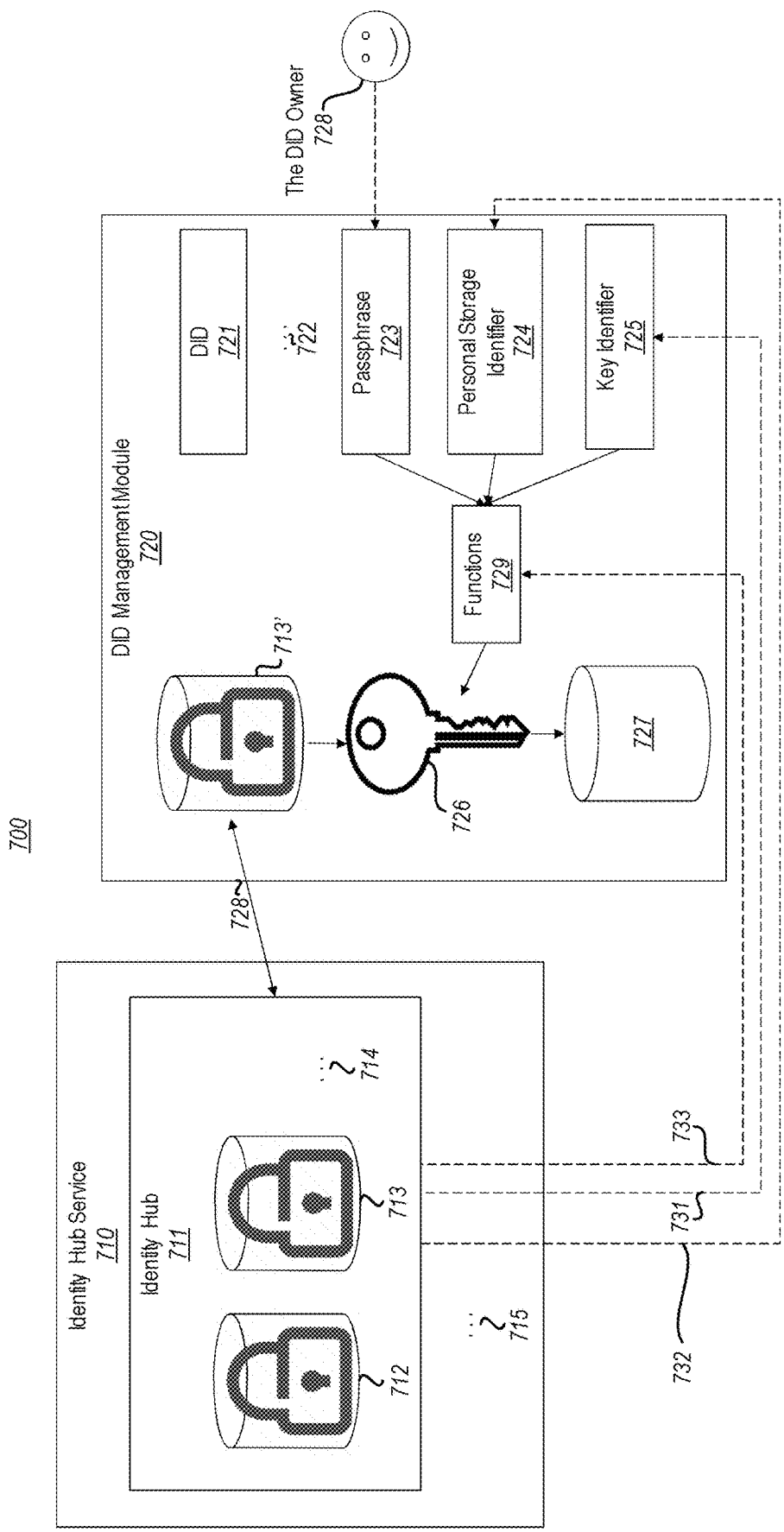
FIG. 7 illustrates an example embodiment for allowing a DID management module of a DID owner to access the data object stored in a personal storage that is associated with the DID owner.

FIG. 7 illustrates an example embodiment 700 for allowing a DID management module of a DID owner to access the data object stored in a personal storage (e.g., the identity hub 711). Referring to FIG. 7, an identity hub 711 of a DID owner 201 is hosted in an identity hub service 710. The identity hub service 710 may be a cloud service. The ellipsis 715 represents that the identity hub service 710 may host multiple identity hubs, each of which corresponds to a different DID. The identity hub 711 may correspond to the identity hub 411 of FIG. 4, and stores one or more encrypted data objects 712, 713 of the DID owner. The ellipsis 714 represents that there may be any number of encrypted data objects stored in the identity hub 711.

Each of these encrypted data objects 712 and 713 may be encrypted using the embodiment described with respect to FIGS. 5 and 6 above. Thus, each of the encrypted objects 712 and 713 may be encrypted by a different encryption/decryption key. As described with respect to FIGS. 5 and 6, at least some of the data objects may be encrypted by encryption/decryption keys generated based on the passphrase 601, the personal storage identifier 502, the personal storage identifier 502, 602, and a key identifier 602.

The DID management module 720 is associated with the DID owner 201 who owns the data stored in the identity hub 711. The DID management module 720 may correspond to the DID management module 320. The DID management module 720 may be a mobile wallet app, an app installed on a personal computer, and/or a browser. The DID management module 720 is configured to have access to the data 712 and 713 stored in the identity hub 711. As illustrated in FIG. 3, the DID management module 320 or 720 may be able to manage multiple DIDs. For example, as illustrated in FIG. 7, the DID management module 720 manages the DID 721. The ellipsis 722 represents that the DID management module 720 may manage any natural number of DIDs that may be owned by a same user, the DID owner 728.

Also, the DID 721 is associated with the identity hub 711. Thus, the DID management module 720 is capable of access data objects 712, 713 stored in the identity hub 711. However, since the data objects 712 and 713 stored in the identity hub 711 are encrypted, the DID management module 720 not only needs to be able to receive the encrypted data objects 712 and 713, but also needs to be able to decrypt the encrypted data objects 712 and 713.

As described above with respect to FIGS. 5 and 6, the encryption/decryption keys that are used to encrypt the data object 712 and 713 were generated using a passphrase and some other constants that can be retrieved by computing systems (e.g., the identity hub 711 and/or the DID management module 720). Accordingly, the DID management module 720 will be able to regenerate the encryption/decryption key as long as the DID management module 720 has access to the passphrase 723.

Referring to FIG. 7, the passphrase 723 may be entered each time by the DID owner 728 when a data object 712 or 713 is to be accessed. Alternatively, the passphrase 723 may be entered initially by the DID owner 728 and stored in the DID management module 720. Thus, each time, when a data object 712 or 713 is to be accessed again, the DID management module 720 can access the stored passphrase 723 automatically. Also, the personal storage identifier 724 of each personal storage (e.g., identity hub 711) may be obtained from the identity hub 711 each time when the encrypted data 712 or 713 is to be accessed. Alternatively, the personal storage identifier 724 may first be obtained from the identity hub 711, and then stored in the DID management module 720. Thus, each time, when a data object 712 or 713 is to be accessed, the DID management module 720 can access the stored personal storage identifier 724 directly.

The bi-directional arrow 728 represents a communication channel between the identity hub 711 and the DID management module 720. The DID management module 720 may request for the data object 713 stored at the identity hub 711 on behalf of the DID 721. In response to the request, the identity hub 711 may verify the identity of the DID 721. Alternatively, the identity hub 711 may not have to verify any identity, since the data object 713 has been encrypted. The identity hub 711 may send the encrypted data object 713 to the DID management module 720. The DID management module 720 may temporarily store or permanently store the received encrypted data object 713' at a local storage or a memory. Since the data object 713' is an encrypted data object, the DID management module will not be able to access it unless the encryption/decryption key is available.

In some embodiment, the identity hub 711 may cause the DID management module to have the DID owner 717 to enter the passphrase 723. In some embodiments, the DID owner 717 may have previously entered the passphrase 723, and the previously entered passphrase 723 has been stored at the DID management module 720. The DID management module 720 is also configured to obtain the personal storage identifier 724 and the key identifier 725. The personal storage identifier 724 corresponds to the identity hub 711. The key identifier 725 corresponds to the encryption/decryption key used to encrypt the data object 713.

The personal storage identifier 724 and the key identifier 725 may be readily accessible from the identity hub 711 or in the metadata of the encrypted data object 713, 713'. Alternatively, the DID management module 720 may request the information related to the personal storage identifier 724 and the key identifier 725 from the identity hub 711. In response to the request, the DID management module 720 may then send the personal storage identifier 724 and the key identifier 725 to the DID management module 720. The communications related to requesting and receiving the personal storage identifier 724 and the key identifier 725 are represented by the dotted arrows 731 and 732.

Based on the passphrase 723 and the personal storage identifier 724, the DID management module 720 is configured to regenerate the seed 607 based on the function 603. The DID management module 720 is also configured to regenerate the encryption/decryption key 726 using the regenerated seed 607, the personal storage identifier 502 or 602, and the key identifier 725, based on the function 504 of FIG. 5. The functions 603 and 504 are represented by the functions block 729. In some embodiment, the functions 729 may be included in the metadata of the encrypted data 713, 713'. Alternatively, the functions 729 may be obtained from the identity hub, which is represented by the dotted arrow 733. Alternatively, in some embodiment, the functions 729 may have been installed as part of the system of the DID management module 720 and/or the identity hub 711.

Once the encryption/decryption key 726 is generated, the DID management module 720 may then decrypt the encrypted data object 713' to recover the accessible data object 727. The decrypted data object 727 may be stored in a non-volatile storage (e.g., a hard drive) at the DID management module 720. Alternatively, the decrypted data object 727 may be stored temporarily (e.g., in a volatile memory, a RAM). As such, only when the DID owner needs to review the content of the data object 713', the encrypted data 713' is decrypted for the DID owner's review. Such an embodiment provides additional security for protecting the personal data of the DID owner.

Figure 8:
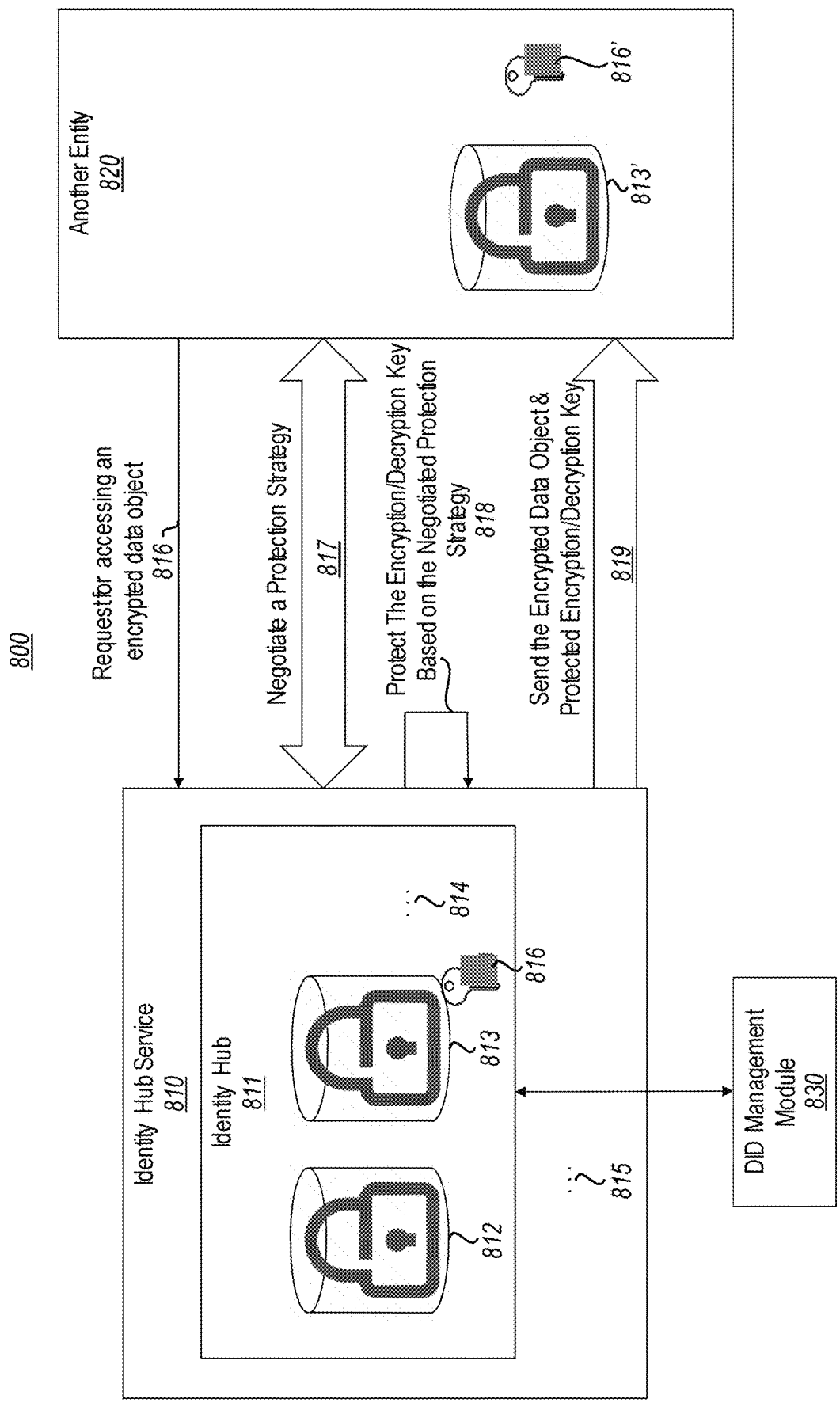
FIG. 8 illustrates an example embodiment for sharing with another entity an encrypted data object stored in a personal storage that is associated with a DID via a negotiated protection strategy.

Further, the principles described herein not only allows the encrypted data objects stored in a personal storage that is associated with a DID to be accessible by the DID management modules that is configured to manage the DID, but also allow the encrypted data to be shared to another entity that may not be associated with the DID. FIG. 8 illustrates an example embodiment for sharing with another entity an encrypted data object stored in a DID owner's personal storage via a negotiated protection strategy.

Referring to FIG. 8, the identity hub service 810 may be similar to the identity hub service 710 of FIG. 7, and the identity hub 811 may be similar to the identity hub 711 of FIG. 7. The identity hub 811 stores one or more encrypted data objects 812 and 813. The ellipsis 814 represents that there may be any number of encrypted data objects stored in the identity hub 811. The ellipsis 815 represents that there may be any number of identity hubs that are hosted at the identity hub service 810. Each of these identity hubs is associated with a corresponding DID, and each of these identity hubs stores personal data of the corresponding DID owner.

However, unlike FIG. 7, in which the DID management module that manages the DID is requesting for accessing a data object stored at the identity hub 711, in FIG. 8, another entity 820 that is not associated with the DID is requesting for accessing a data object 813 stored at the identity hub 811, which is represented by the one-directional arrow 816.

Once the identity hub 811 receives the request from the other entity 820, the identity hub 811 and the other entity 820 communicate with each other to "negotiate" a protection strategy for protecting the encryption/decryption key of the encrypted data 813. The communications related to the negotiation between the identity hub 811 and the other entity 820 are represented by the bi-directional arrow band 817. The negotiation may be based on the type of data requested.

In some embodiments, the more important data, the more secured protection is required. For example, the data object 813 may be medical data of the DID owner. In such a case, more secured protection may be required. The more secured protection may require the identity hub 811 to encrypt the encryption/decryption key before sending it to the other entity 820. In some embodiment, the negotiation 817 may be based on the pre-set rules related to the data object 813, the metadata of the data object 813, and/or any other information stored in the identity hub 811.

In some embodiment, the negotiation 817 may require the identity hub 811 to communicate with the DID management module 830 that manages the corresponding DID. For example, the identity hub 811 may require the DID owner's consent before committing to any data protection strategy. As another example, the identity hub 811 may require the DID owner's input to determine what type of protection is to be implemented to protect the encryption/decryption key.

In some situations, the data may not be worth protection. For example, if the data object 813 is social media data or a personal photo that the DID owner does not mind sharing with the public, the encryption/decryption key may be directly sent to the other entity 820 without additional protection. As another example, the identity hub 811 may decrypt the encrypted data 813 and send the decrypted data to the other entity without any protection.

However, in many situations, a protection strategy is negotiated, and the encryption/decryption key will be further protected before being shared with the other entity 820 via a computer network. Based on the negotiated protection strategy, the identity hub 811 then protects the encryption/decryption key, which is represented by the arrow 818. For example, the protection strategy may require the encryption/decryption key to be encrypted 816. The protected encryption/decryption key 816 and the encrypted data object 813 are then sent to the other entity 820 via a computer network.

After receiving the encrypted data object 813' and the protected encryption/decryption key 816', the other entity 820 may then recover the protected encryption/decryption key 816', and the use the recovered encryption/decryption key to decrypt the encrypted data object 813'. As such, both the DID owner's personal data 813 and the encryption/decryption key 816 are protected during the transmission via the computer network. If the data 813 and/or the protected encryption key 819 are obtained or stolen by a third entity during the transmission, the third entity cannot read the encrypted data object 813 without the encryption/decryption key, because the encryption/decryption key has been protected prior to being transmitted in the computer network.

Figure 9:
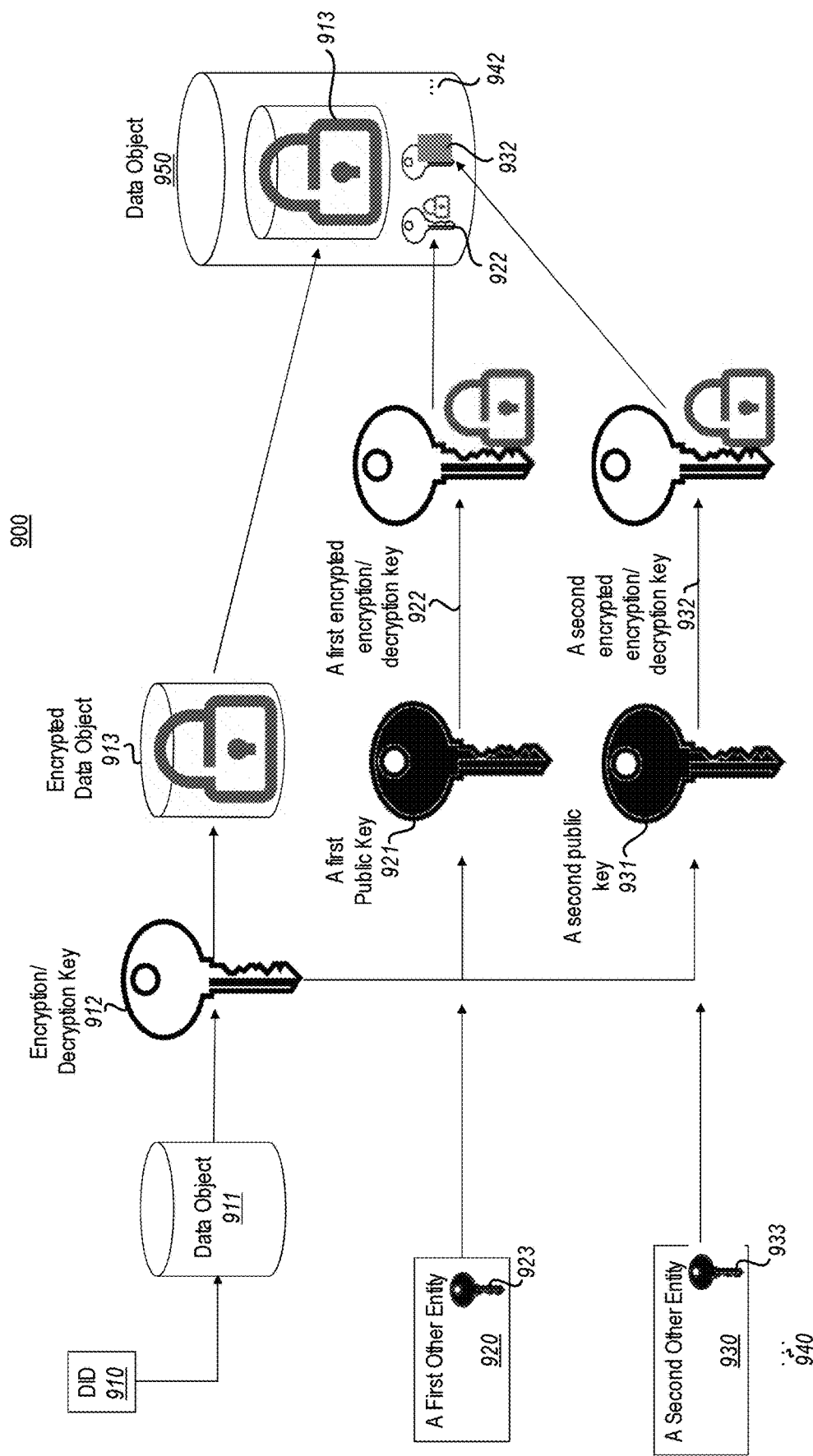
FIG. 9 illustrates an example protection strategy that may be implemented for protecting the encryption/decryption key.

FIG. 9 further illustrates an example of protection strategy 900 that may be implemented to protect the encryption/decryption key 902. The protection strategy 900 includes using a private/public key pair of the other entity to encrypt/decrypt the encryption/decryption key 902. The encrypted data object 913 may correspond to the encrypted data object 812 or 813 of FIG. 8.

As illustrated in FIG. 9, a data object 911 is associated DID 910. The data object 911 is first encrypted by an encryption/decryption key 912 into an encrypted data object 903. The encryption/decryption key 912 may be generated using the embodiment described with respect to FIGS. 5 and 6. The encrypted data object 913 cannot be read or accessed until it is decrypted using the encryption/decryption key 912. There may be more than one other entity that has requested to access the data object 911 or the encrypted data 913. As illustrated in FIG. 9, there are two other entities, a first other entity 920 and a second other entity 930, each of which has requested to access the data object 911 or the encrypted data object 913.

Assuming each of the first other entity 920 and the second other entity 930 has negotiated with the DID 910 (i.e., the identity hub that stores the data object 911 and/or the DID management module that manages the DID 910) a protection strategy for protecting the encryption/decryption key 912. The negotiated protection strategy for the encryption/decryption key 912 is to use the other entity's key to encrypt the encryption/decryption key before transmitting the encryption/decryption key via any computer network. In particular, an asymmetric encryption regime using a private/public key pair is implemented to encrypt the encryption/decryption key.

As briefly discussed previously, a private/public key pair is a pair of different but related keys, one of which may be used to encrypt a data object, and the other one of which may be used to decrypt the encrypted data object. One of the keys is kept secret to the owner itself, and the secret key is called a private key. The other key is given to the public, and that key is called a public key.

Each of the other entities 920 and 930 has its own private/public key pairs. As illustrated, the first other entity 920 has a first public key 921 and a first private key 923. The public key 921 is shared with the identity hub that stores the data object 911 or 913 and/or the DID management module that is configured to manage the DID 910. The private key 933 is kept to the first other entity 920 itself. Similarly, the second other entity 930 has a second public key 931 and a second private key 933. Also, the second public key 931 is shared with the DID 910 (e.g., the associated identity hub and/or the DID management module) and the second private key 933 is kept secret to the second other entity 930 itself.

As illustrated in FIG. 9, in response to the negotiated protection strategy, the encryption/decryption key 912 is encrypted by the first public key 921 to generate a first encrypted encryption/decryption key 922. The first encrypted encryption/decryption key 922 is then stored with the encrypted data object 913. Similarly, the encryption/decryption key 912 is also encrypted by the second public key 931 to generate a second encrypted encryption/decryption key 932. The second encrypted encryption/decryption key 932 is also stored with the encrypted data object 913. The ellipsis 940 represents that there may be any number of other entities that are granted access to the encrypted data object 913. The ellipsis 942 represents that there may be any number of encrypted encryption/decryption keys stored with the encrypted data object 913.

The encrypted data object 913 stored with each encrypted encryption/decryption key 922, 932 forms a data object 950. When one of the other entities 920 and 930 requests to access the encrypted data object 913, the data object 950 (including the encrypted data object 913 and each encrypted encryption/decryption key 922 and 932) may be sent to the requesting entity. The requesting entity (e.g., the first other entity 920, or the second other entity 930) may then use its private key 923 or 933 to decrypt the encrypted encryption/decryption key 922 or 932. The decrypted encryption/decryption key 912 may then be used to decrypt the encrypted data object 913.

For example, the first other entity 920 may request for the data object 911 or the encrypted data object 913 from the identity hub (not shown) that stores the data object 911 and/or 913. The identity hub may send the data object 950 to the first other entity 920. The first other entity 920 may then use its private key that is related to the first public key 921 to decrypt the first encrypted encryption/decryption key 922 to recover the encryption/decryption key 912. The first other entity 920 can then use the recovered encryption/decryption key 912 to decrypt the encrypted data object 913 to recover the data object 911.

As described above, when the data object 950 is transmitted via a computer network, the encrypted data object 913 and the encrypted encryption/decryption keys 922 and 932 are transmitted via the computer network. As such, in case a third party (that should not have access to the data object 911) obtains the data object 950, the third party cannot easily decrypt the encrypted encryption/decryption key 922 and/or the encrypted data object 913.

Furthermore, the above described embodiment also allows a DID owner to share its data without recording the requesting entities identities or identifiers. The identities of the data requesting (or data receiving) entities are embedded in the encrypted encryption/decryption keys. However, merely having the encrypted encryption/decryption keys cannot reconstruct identities of the first other entity 920 and the second other entity 930. As such, not only the shared data is protected during transmission via the computer network, but also the relationships amongst the DID owner and the data receiving entities are protected from the service provider of the identity hub.

In particular, the first and second other entities 920 and 930 may be related to the owner of DID 910. For example, the first and second other entities 920 and 930 may be associated with other DIDs, and the other DIDs and the DID 910 may be owned by the same owner. If the identity hub's service provider knows each of the DIDs of the other entities, the identity hub's service provider may be able to determine the relationship of these different DIDs, thus, compromise the privacy of the owner of the multiple related DIDs. The principles described herein solve the above-mentioned problem by allowing the sharing of encrypted data object 913 without recording the other entities' identities (e.g., DID or any other identifier), so that the privacy of the owner of the DID 910, and the other entities 920 and 930 are further protected.

Figure 10:
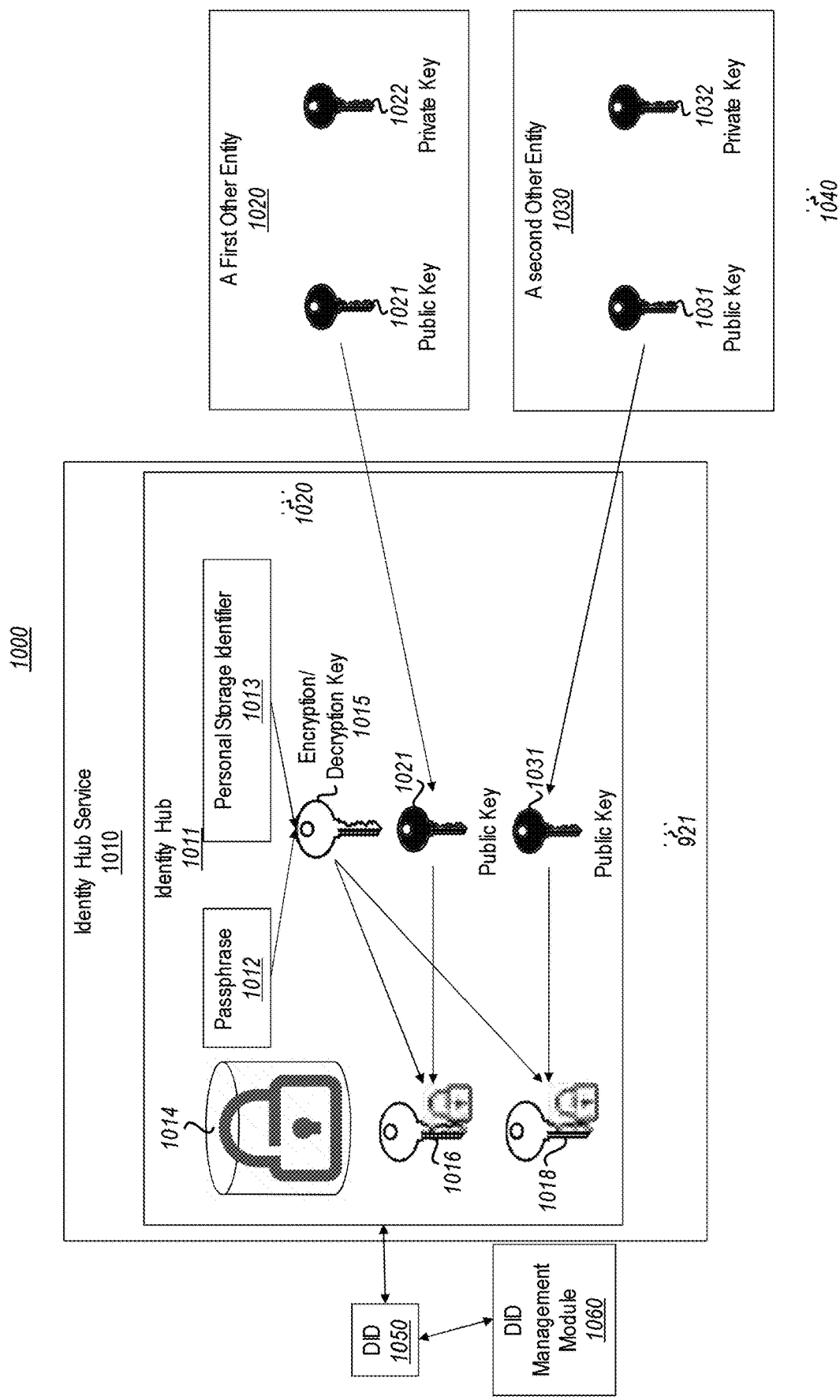
FIG. 10 illustrates an example environment in which a data object is encrypted, and the encryption/decryption key is also protected.

FIG. 10 further illustrates an example environment 1000 in which a data object is encrypted using an encryption/decryption key 1015, and the encryption/decryption key 1015 is protected via a public key of the other entity. Referring to FIG. 10, the identity hub service 1010 may correspond to the identity hub service 810 of FIG. 8; the identity hub 1011 may correspond to the identity hub 811 of FIG. 8, the encrypted data object 1014 may correspond to any one of the data objects 812 and 813 of FIG. 8. The identity hub 1011 is hosted at the identity hub service 1010. The identity hub 1011 is associated with a DID 1050. The identity hub 1011 stores the encrypted data object 1014.

A first other entity 1020 and a second other entity 1030 may correspond to the first other entity 920 and the second other entity 930 of FIG. 9. Each of the first and second other entities 1020 and 1030 is not associated with the DID 1050. The ellipsis 1040 represents that there may be any number of other entities that are not associated with the DID 1050, and may request for access to the encrypted data object 1014.

The first other entity 1020 may first send a request for access to the encrypted data object 1014 to the identity hub 1011. The identity hub 1011 and/or a DID management module 1060 of the DID 1050 may negotiate a protection strategy for protecting the encryption/decryption key 1015. The protection strategy is to protect the encryption/decryption key 1015 with a public key of the first other entity 1020. Accordingly, the first other entity 1020 sends its public key 1021 to the identity hub 1017, while the private key 1022 that is related to the public key 1021 is kept secret at the first other entity 1020.

At substantially the same time, based on the negotiated protection strategy, the identity hub 1011 (and/or the DID management module 1060) regenerates the encryption/decryption key 1015 based on a passphrase 1012 and the personal storage identifier 1013. In some embodiment, a key identifier (not shown) may also be required to regenerate the encryption/decryption key. The regenerated encryption/decryption key 1015 is then encrypted using the received public key 1021 of the first other entity 1020. The encrypted encryption/decryption key 1016 is then stored with the encrypted data object 1014. To protect the encrypted data object 1014, the regenerated encryption/decryption key 1015 should not be permanently stored in a non-volatile storage. In some embodiment, the regenerated encryption/decryption key 1015 may be temporarily stored in the identity hub 1011 (e.g., stored in a RAM), and once the encryption/decryption key 1015 is encrypted by the public key 1021, the encryption/decryption key 1015 is deleted from the identity hub 1011.

Similarly, at a different time or at a substantially the same time, a second other entity 1013 may request for access to the same encrypted data object 1014 stored in the identity hub 1011. The identity hub 1011 and/or the DID management module 1060 may negotiate the same protection strategy to protect the encryption/decryption key 1015, i.e., to protect the encryption/decryption key 1015 using a public key 1031 of the second other entity 1030. Similarly, the second other entity 1030 sends its public key 1031 to the identity hub 1011, while keeping its private key 1032 secret.

Since the encryption/decryption key 1015 is not stored permanently in the identity hub 1011, each time the encryption/decryption key 1015 is needed, the identity hub 1011 (and/or the DID management module 1060) regenerates the encryption/decryption key 1015 again at least based on a passphrase 1012 and the personal storage identifier 1013. Similarly, here, when the protection strategy of the encryption/decryption key 1015 is determined, the encryption/decryption key 1015 is regenerated. The regenerated encryption/decryption key 1015 is then encrypted using the public key 1031 of the second other entity 1030. The encrypted encryption/decryption key 1018 is also stored with the encrypted data object 1014. Also, once the encrypted encryption/decryption key 1018 is generated, the encryption/decryption key 1015 should be deleted from the identity hub 1011.

Figure 11:
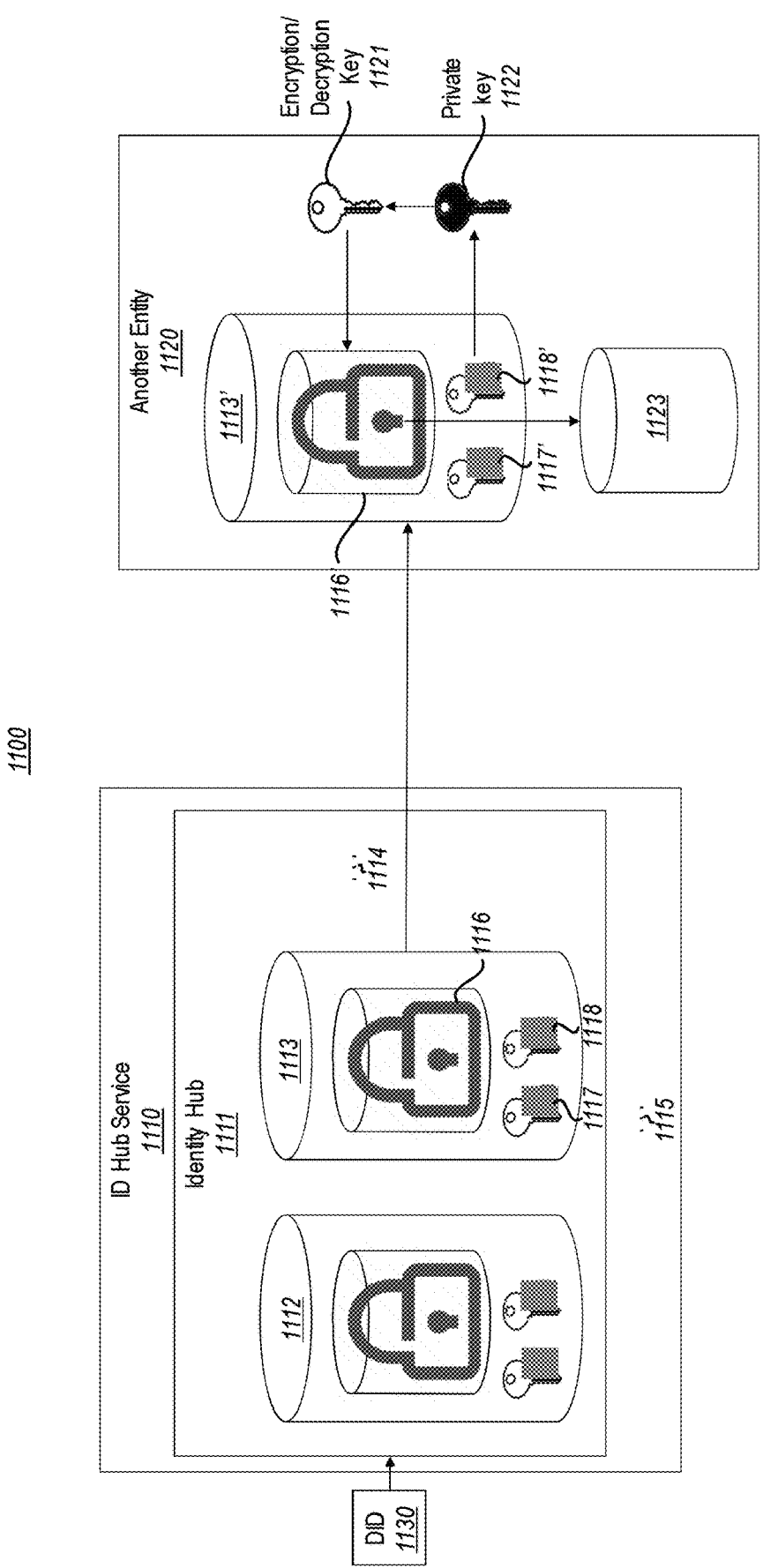
FIG. 11 illustrates an example environment in which another entity receives an encrypted data object from a personal storage that is associated with a DID.

FIG. 11 illustrates an example embodiment 1100 in which another entity 1120 receives the encrypted data object 1116 from a personal storage (i.e., an identity hub 1111) that is associated with a DID 1130. The identity hub 1111 may correspond to the identity hub 1011 of FIG. 10, the identity hub service 1110 may correspond to the identity hub service 1010 of FIG. 10, and the DID 1130 may correspond to the DID 1050 of FIG. 10. The identity hub 1111 stores one or more encrypted data objects 1112 and 1113. The ellipsis 1114 represents that there may be any natural number of encrypted data objects stored in the identity hub 1111. The identity hub 1111 is hosted in the identity hub service 1110, and the ellipsis 1115 represents that the identity hub service 1110 may host any natural number of identity hubs, each of which is associated with a DID. The other entity 1120 may correspond to any one of the first and second other entities 1020 and 1030 of FIG. 10.

Assuming, the other entity 1120 has previously negotiated a protection strategy with the identity hub 1111 for accessing the encrypted data object 1116 as illustrated in FIG. 10. Accordingly, the encryption/decryption key that used to encrypt the data object 1113 has already been encrypted by public keys of the other entities 1120, and the encrypted encryption/decryption keys 1117 and 1118 have been stored with the encrypted data object 1116. The data object 1113 is a data object, including the encrypted data object 1116 and the encrypted encryption/decryption keys 1117 and 1118.

In response to the request for accessing the encrypted data object 1116, the identity hub 1111 sends the data object 1113 to the other entity 1120. The other entity 1120 may store the data object 1113' at a local storage. The stored data object 1113' includes multiple encrypted encryption/decryption keys 1117' and 1118'. One of the encrypted encryption/decryption keys 1117' and 1118' (e.g., key 1118') was encrypted using the other entity 1120's public key. Thus, the other entity 1120 can decrypt the encrypted encryption/decryption key 1118' using its private key 1122 to recover the encryption/decryption key 1121. The other entity 1120 can then use the recovered encryption/decryption key 1121 to decrypt the encrypted data object 1116' to recover the data object.

The following discussion now refers to a number of methods and method acts that may be performed. Although the method acts may be disused in a certain order or illustrated in a flow chart as occurring in a particular order, no particular ordering is required unless specifically stated, or required because an act is dependent on another act being completed prior to the act being performed.

Figure 12:
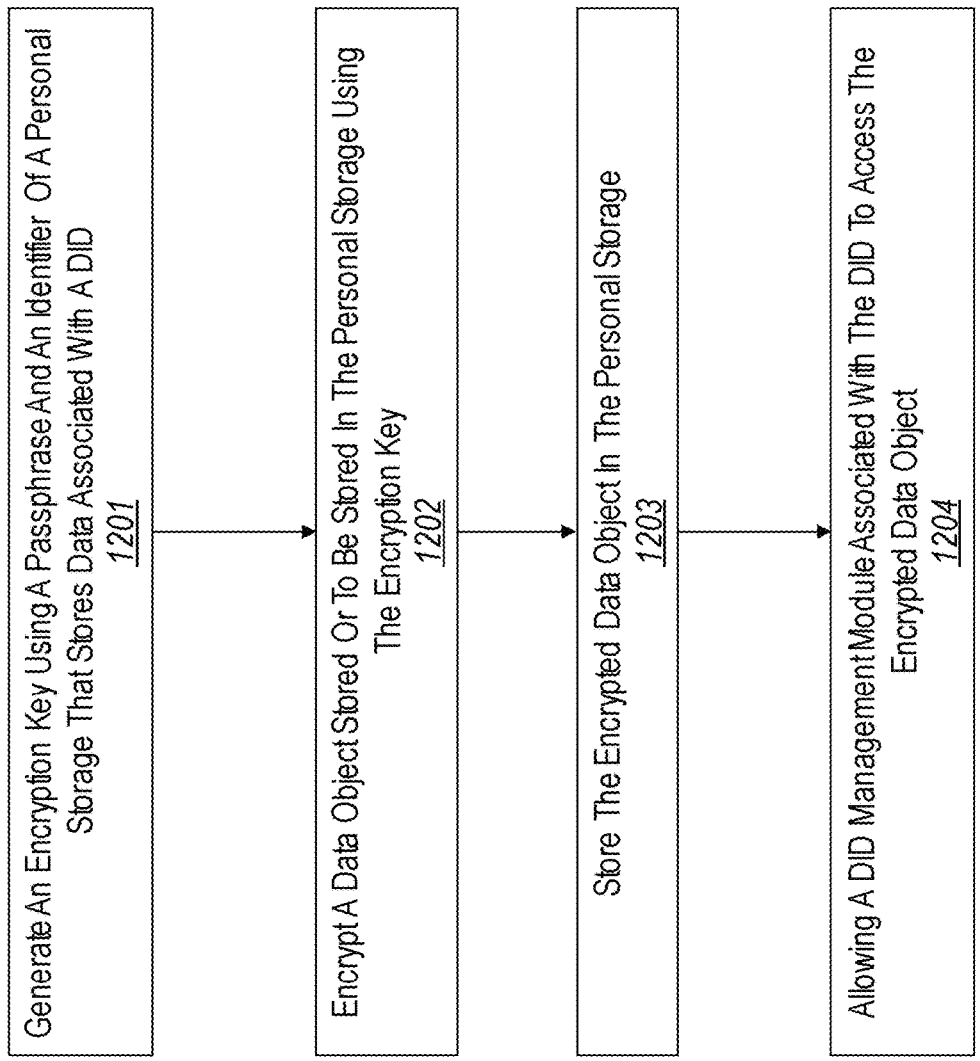
FIG. 12 illustrates a flowchart of an example method for encrypting and storing one or more data object in a personal storage that is associated with a DID.

FIG. 12 illustrates a flow chart of an example method 1200 for encrypting and storing one or more encrypted objects in a personal storage that is associated with a DID. The method 1200 includes generating an encryption key using a passphrase and an identifier of a personal storage that stores data associated with a DID (act 1201). The passphrase may correspond to the passphrase 601 of FIG. 6. The identifier of the personal storage may correspond to the personal storage identifier 602 of FIG. 6 and/or 502 of FIG. 5. Referring back to FIG. 6, the passphrase 601 and the personal storage identifier 602 may be used as inputs 604 and 605 of function 603 to generate an output 606. The output 606 may then be used as a seed 607. Referring back to FIG. 5, the seed 607, 501, the personal storage identifier 502, and a key identifier 503 may then be used as inputs 505, 506 and 507 of function 504 to generate an output 508. The key identifier 503 may be automatically generated by the computing system or be entered by the DID owner. The output 508 may then be used as the encryption/decryption key 509.

As briefly described above, in some embodiments, a symmetric encryption algorithm may be implemented. In such a case, the encryption/decryption key may be one key that is used to encrypt and decrypt the data object. In some embodiments, an asymmetric encryption algorithm may be implemented. In such a case, the encryption/decryption key may be a private/public key pair.

The method 1200 also includes encrypting a data object stored or to be stored in the personal storage using the encryption key (act 1202). The data object may correspond to the data object 506 of FIG. 5. Referring back to FIG. 5, the data object 506 is encrypted by the encryption/decryption key 509 to generate an encrypted data object 510. The encrypted data object is then stored in the personal storage (act 1203).

The method 1200 further includes allowing a DID management module associated with the DID to access the encrypted data object (act 1203).

Figure 13:
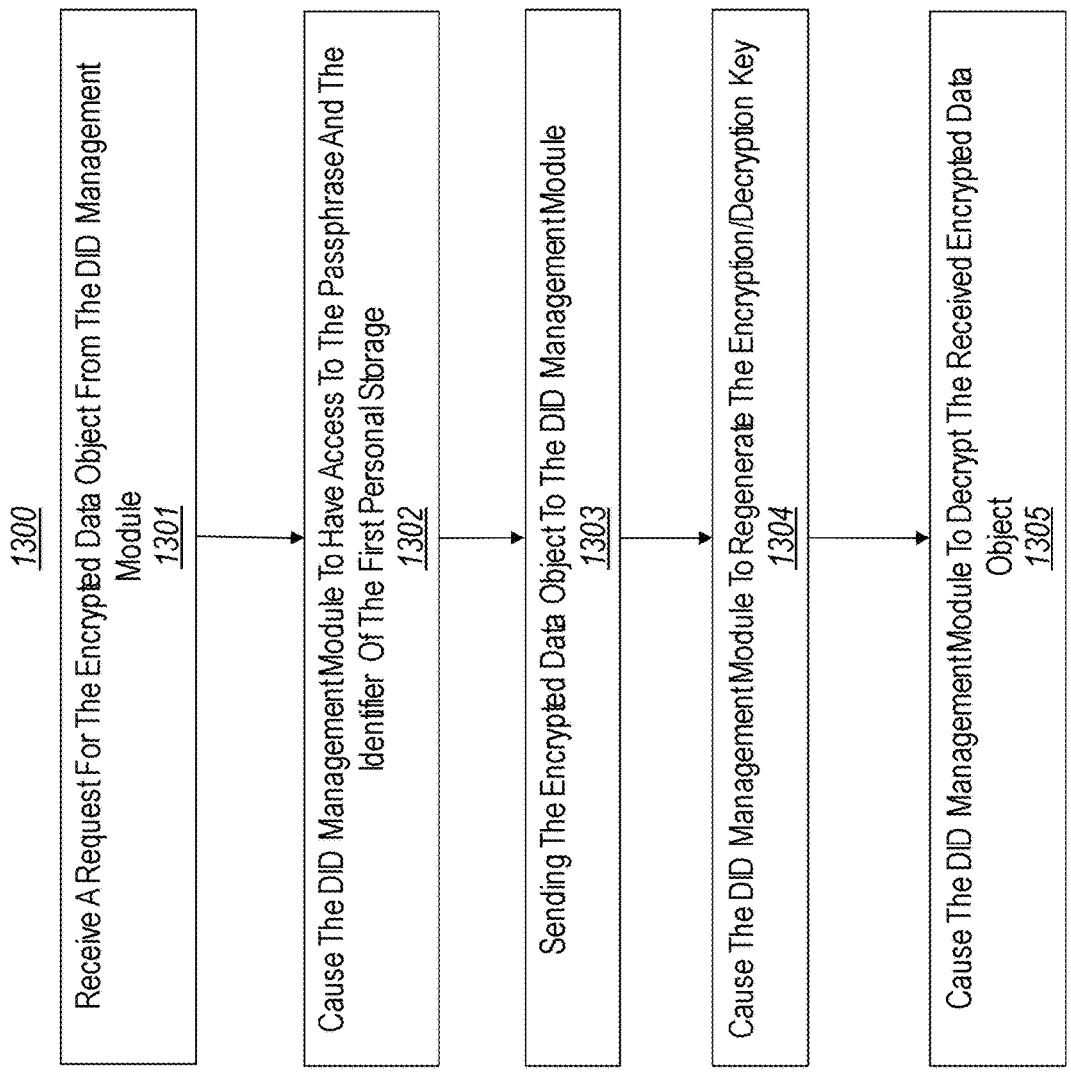
FIG. 13 illustrates a flowchart of an example method for allowing a DID management module associated with the DID to access an encrypted data object.

FIG. 13 illustrates a flowchart of an example method 1300 for allowing a DID management module associated with the DID to access an encrypted data object, which may correspond to the act 1203 of FIG. 12. The method 1300 may include receiving a request for the encrypted data object from the DID management module (act 1301). The encrypted data object may correspond to the encrypted data object 713 of FIG. 7. The DID management module may correspond to the DID management module 720 of FIG. 7.

The method 1300 may also include causing the DID management module to have access to the passphrase and the identifier of the first personal storage in response to the request (act 1302). Referring back to FIG. 7, the passphrase 723 may be caused to be entered by the DID owner 728. Alternatively, or in addition, the passphrase 723 may be stored at the DID management module 720 after the DID owner 728 first entered it. Further, the personal storage identifier 724 and/or the key identifier 725 may be included in the metadata of the encrypted data object 713'. Alternatively, or in addition, the personal storage identifier 724 and/or key identifier 725 may be obtained from the identity hub 711 where the encrypted data object 713 is stored.

Thereafter, the encrypted data object is sent to the DID management module (act 1303). Referring back to FIG. 7 again, the encrypted data object 713 is sent to the DID management module 720. The DID management module is then caused to regenerate the encryption/decryption key (act 1304). As illustrated in FIG. 7, the DID management module 720 uses the passphrase 723, personal storage identifier 724, and the key identifier 725 as inputs of functions 729 to regenerate the encryption/decryption key 726.

Finally, the DID management module is caused to decrypt the received encrypted data object using the regenerated encryption/decryption key (act 1305). As illustrated in FIG. 7, the encrypted data object 713' is decrypted using the recovered encryption/decryption key 726 to generate the data object 727.

Further, the principles described herein not only allowing the encrypted data objects associated with a DID to be accessed by the DID management module that manages the DID, but also allowing the encrypted data to be shared with another entity that is not associated with the DID.

Figure 14:
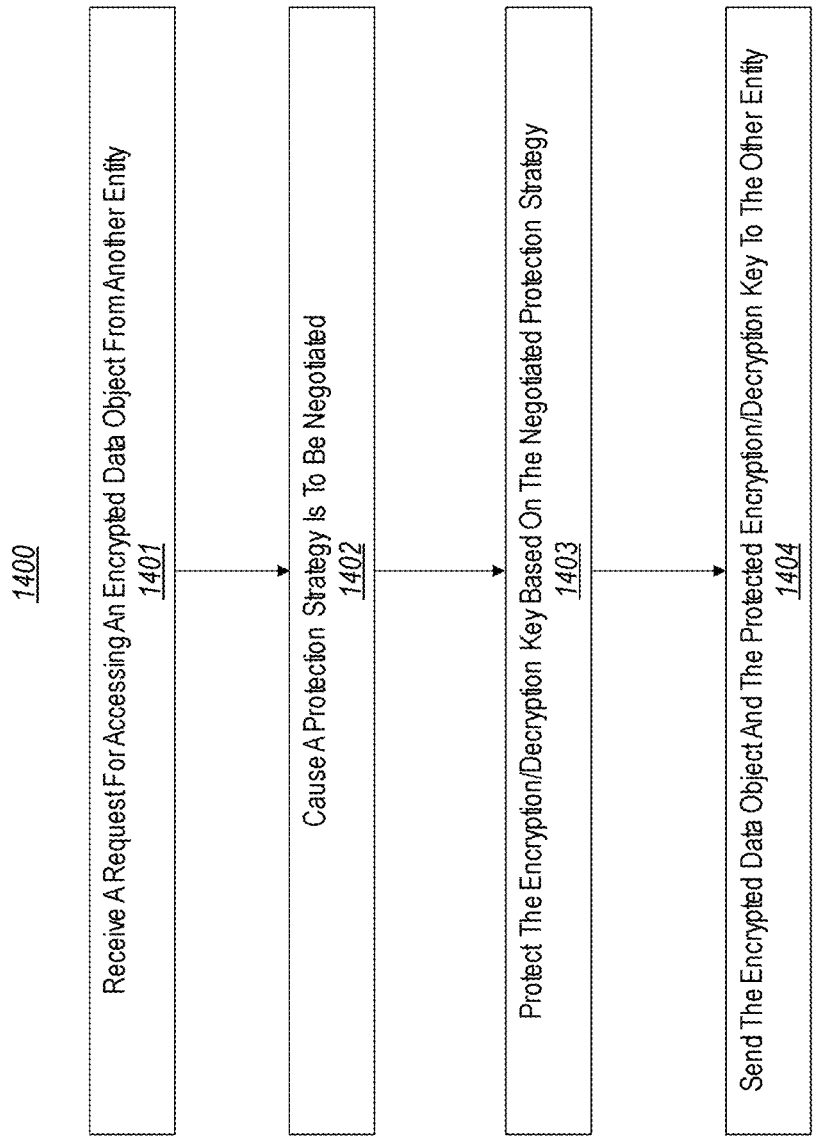
FIG. 14 illustrates a flowchart of an example method for sharing an encrypted data object stored in a personal storage that is associated with a DID with another entity that is not associated with the DID.

FIG. 14 illustrates a flowchart of an example method 1400 for sharing an encrypted data object stored in a personal storage that is associated with a DID with another entity that is not associated with the DID. The personal storage may correspond to the identity hub 811 of FIG. 8; the encrypted data object may correspond to the encrypted data object 813 of FIG. 8; and the other entity may correspond to the other entity 820 of FIG. 8. The method 1400 includes receiving a request for accessing an encrypted data object from another entity that is not associated with the DID (act 1401).

In response to the request, a protection strategy for protecting the encryption/decryption key is caused to be negotiated between the personal storage that is associated with the DID (and/or the DID management module that manages the DID) and the other entity (act 1402). The other entity may be an entity associated with another DID that is different from the DID. The other entity may be a DID management module that is configured to manage the other DID. The "negotiation" may be based on the type of data being accessed. For example, some data objects that the DID owner does not mind to share with the public may not require a highly secured protection, and some data objects that the DID owner would like to keep private may require more secure protection (e.g., medical data, data including personally identifiable information, etc.).

Based on the negotiated protection strategy, the encryption/decryption key may then be protected (act 1403). The protection strategy may be to encrypt the encryption/decryption key before sending it to the other entity via a computer network. Finally, the encrypted data object and the protected encryption/decryption key are then sent to the other entity via a computer network (act 1404).

Figure 15:
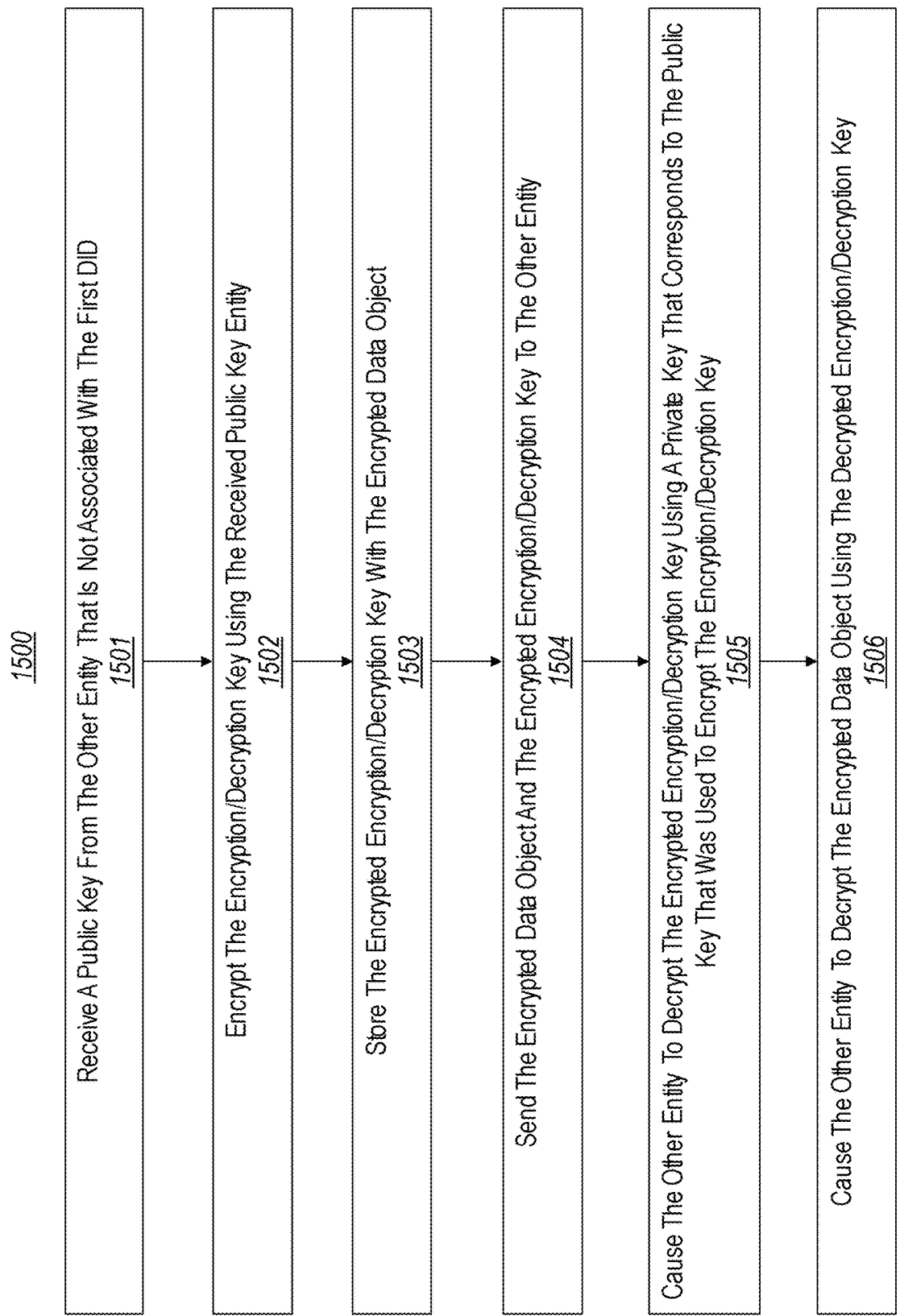
FIG. 15 illustrates a flow chart of an example method for protecting an encryption/decryption key via an example protection strategy, in which the encryption/decryption key is encrypted by a public key of another entity.

FIG. 15 illustrates a flowchart of an example method 1500 for protecting the encryption/decryption key via an example protection strategy in which a public key of another entity is used to encrypt the encryption/decryption key.

The method 1500 includes receiving a public key from the other entity (act 1501). The encryption/decryption key here may correspond to the encryption/decryption key 1021 of FIG. 10, the other entity here may correspond to any one of the first and second other entities 1020 and 1030 of FIG. 10, and the public key of the other entity here may correspond to any one of the public keys 1021 and 1031 of FIG. 10. As illustrated in FIG. 10, the first other entity 1020 sends its public key 1021 to the identity hub 1011, and the second other entity 1030 sends its public key 1031 to the identity hub 1011.

The encryption/decryption key is then encrypted using the received public key of the other entity (act 1502). Referring to FIG. 10, the encryption/decryption key 1015 is encrypted by the first other entity's public key 1021 into the encrypted encryption/decryption key 1016, and the encryption/decryption key 1015 is also encrypted by the second other entity's public key 1031 into the encrypted encryption/decryption key 1018.

The encrypted encryption/decryption key is then stored with the encrypted data object (act 1503). As illustrated in FIG. 10, the encrypted encryption/decryption keys 1016 and 1018 are stored with the encrypted data 1014.

The encrypted data object and the encrypted encryption/decryption key are then sent to the other entity (act 1504). The encrypted data object may correspond to the encrypted data object 1116 of FIG. 11. The encrypted encryption/decryption key may correspond to the encrypted encryption/decryption key 1118. The other entity may correspond to the other entity 1120 of FIG. 11. Referring back to FIG. 11, the data object 1113 including the encrypted data object 1116 and the encrypted encryption/decryption keys 1117, 1118 are then sent to the other entity 1120.

The other entity is then caused to decrypt the encrypted encryption/decryption key using a private key that corresponds to the public key that was used to encrypt the encryption/decryption key (1505). The private key here may correspond to the private key 1122 of FIG. 11. As illustrated in FIG. 11, the encrypted encryption/decryption key 1118' is decrypted using the other entity 1120's private key 1122 to recover the encryption/decryption key 1121.

Finally, the other entity is caused to decrypt the encrypted data object using the decrypted encryption/decryption key (act 1506). Referring back to FIG. 11, the recovered encryption/decryption key 1121 is used to decrypt the encrypted data object 1116' to generate the decrypted data object 1123. The decrypted data object 1123 can then be accessed (e.g., read) by the other entity 1120.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware storage devices having thereon computer-executable instructions that are structured such that, when executed by the one or more processors, configure the computing system to perform at least:
   generate an encryption/decryption key using a passphrase and an identifier of a personal storage that stores or is to store a data object, the personal storage being associated with a decentralized identifier (DID);
   encrypt the data object stored or to be stored in the personal storage using the encryption/decryption key;
   store the encrypted data object in the personal storage;
   receive a request for accessing the encrypted data object from another entity that is not associated with the DID;
   negotiate with the other entity a protection strategy for protecting the encryption/decryption key;
   protect the encryption/decryption key based on the negotiation protection strategy; and
   send the encrypted data object and the protected encryption/decryption key to the other entity.

2. The computing system of claim 1, the computing system further configured to:
   allow a DID management module that is configured to manage the DID to access the data object.

3. The computing system of claim 2, the allowing the DID management module that is configured to manage the DID to access the data object comprising:
   receiving a request for the encrypted data object from a DID management module that is configured to manage the DID;
   sending the encrypted data object to the DID management module.

4. The computing system of claim 3 the allowing the DID management module that is configured to manage the DID to access the data object further comprising:
   causing the DID management module to have access to the passphrase and the identifier of the personal storage;
   causing the DID management module to regenerate the encryption/decryption key; and
   causing the DID management module to decrypt the encrypted data object using the regenerated encryption/decryption key.

5. The computing system of claim 1, wherein the passphrase is received from a user input.

6. The computing system of claim 1, wherein the identifier of the personal storage is a constant that is associated with the first personal storage.

7. The computing system of claim 1, wherein the generating an encryption/decryption key is further based on a key identifier, the key identifier corresponds to the data object, such that a different encryption/decryption key is generated for encrypting a different data object.

8. The computing system of claim 7, wherein the key identifier is generated by the computing system or by a user input.

9. The computing system of claim 1, wherein:
   the negotiated protection strategy comprises protecting the encryption/decryption key using a second encryption/decryption key of the other entity;
   the protecting the encryption/decryption key comprises encrypting the encryption/decryption key using the second encryption/decryption key of the other entity;
   the sending the encrypted data object and the protected encryption/decryption key comprises sending the encrypted data object and the encrypted encryption/decryption key to the other entity.

10. The computing system of claim 9, further comprising causing the other entity to decrypt the encrypted encryption/decryption key; and
    causing the other entity to decrypt the encrypted data object using the decrypted encryption/decryption key.

11. The computing system of claim 9, wherein the protecting the encryption/decryption key further comprising:
    receiving a public key from the other entity, wherein the encrypting the encryption/decryption key includes encrypting the encryption/decryption key using the received public key from the other entity; and
    storing the encrypted encryption/decryption key with the encrypted data object.

12. The computing system of claim 11, the computing system further configured to
    cause the other entity to decrypt the encrypted encryption/decryption key using a private key that corresponds to the public key that was used to encrypt the encryption/decryption key.

13. The computing system of claim 1, wherein the other entity is associated with a second DID that is different from the DID.

14. A method for encrypting and sharing one or more data objects stored in a personal storage that is associated with a decentralized identifier (DID), the one or more encrypted objects being stored in a personal storage associated with a first DID, the method comprising:
    generating an encryption/decryption key using a passphrase and an identifier of the personal storage that stores or is to store a data object;
    encrypting the data object stored or to be stored in the personal storage using the encryption/decryption key;
    storing the encrypted data object in the personal storage;
    receiving a request for accessing the encrypted data object from another entity that is not associated with the DID;
    negotiating with the other entity a protection strategy for protecting the encryption/decryption key;
    protecting the encryption/decryption key based on the negotiated protection strategy; and
    sending the encrypted data object and the protected encryption/decryption key to the other entity.

15. The method of claim 14, the method further comprising:
receiving a request for the encrypted data object from a DID management module that is configured to manage the DID; and
sending the encrypted data object to the DID management module.

16. The method of claim 15, the method further comprising:
causing the DID management module to have access to the passphrase and the identifier of the personal storage;
causing the DID management module to regenerate the encryption/decryption key; and
causing the DID management module to decrypt the encrypted data object using the regenerated encryption/decryption key.

17. The method of claim 14, the method further comprising: wherein the passphrase is received from a user input.

18. The method of claim 14, wherein the identifier of the personal storage is a constant that associated with the first personal storage.

19. A computer program product comprising one or more hardware storage devices having stored thereon computer-executable instructions that are structured such that, when the computer-executable instructions are executed by one or more processors of a computer system, the computer-executable instructions configure the computer system to perform at least:
generate an encryption/decryption key using a passphrase and an identifier of a personal storage that stores or is to store a data object, the personal storage being associated with a decentralized identifier (DID);
encrypt the data object stored or to be stored in the personal storage using the encryption/decryption key;
store the encrypted data object in the personal storage;
receive a request for accessing the encrypted data object from another entity that is not associated with the DID;
negotiate with the other entity a protection strategy for protecting the encryption/decryption key;
protect the encryption/decryption key based on the negotiated protection strategy; and
send the encrypted data object and the protected encryption/decryption key to the other entity.

20. The computer program product of claim 19, the computer system further configured to:
receive a request for the encrypted data object from a DID management module that is configured to manage the DID; and
send the encrypted data object to the DID management module;
cause the DID management module to have access to the passphrase and the identifier of the personal storage;
cause the DID management module to regenerate the encryption/decryption key; and
cause the DID management module to decrypt the encrypted data object using the regenerated encryption/decryption key.

* * * * *